US009002119B2

(12) United States Patent
Hoshino et al.

(10) Patent No.: US 9,002,119 B2
(45) Date of Patent: Apr. 7, 2015

(54) DEVICE METHOD AND PROGRAM FOR HUMAN HAND POSTURE ESTIMATION

(75) Inventors: Kiyoshi Hoshino, Tsukuba (JP); Motomasa Tomida, Tsukuba (JP)

(73) Assignee: University of Tsukuba, National University Corporation, Tsukuba-shi (JP)

( * ) Notice: Subject to any disclaimer, the term of this patent is extended or adjusted under 35 U.S.C. 154(b) by 674 days.

(21) Appl. No.: 12/995,912

(22) PCT Filed: Apr. 20, 2009

(86) PCT No.: PCT/JP2009/057851
§ 371 (c)(1),
(2), (4) Date: Feb. 22, 2011

(87) PCT Pub. No.: WO2009/147904
PCT Pub. Date: Dec. 10, 2009

(65) Prior Publication Data
US 2011/0142353 A1    Jun. 16, 2011

(30) Foreign Application Priority Data

Jun. 4, 2008  (JP) ................................. 2008-147409
Dec. 1, 2008  (JP) ................................. 2008-306854

(51) Int. Cl.
*G06K 9/46*    (2006.01)
*G06K 9/00*    (2006.01)
*G06K 9/62*    (2006.01)

(52) U.S. Cl.
CPC ............ *G06K 9/00375* (2013.01); *G06K 9/628* (2013.01)

(58) Field of Classification Search
USPC ......................................... 382/203, 199, 286
See application file for complete search history.

(56) References Cited

U.S. PATENT DOCUMENTS 6,002,808 A * 12/1999 Freeman ....................... 382/288
6,819,782 B1 * 11/2004 Imagawa et al. ............. 382/115

(Continued)

FOREIGN PATENT DOCUMENTS

JP    2006294018 A    10/2006
WO    2005031612 A1    4/2005
WO    2005046942 A1    5/2005

OTHER PUBLICATIONS

Tanimoto et al., "Realtime and accurate posture estimation of human hand for human-robot communication", Journal of Human Interface Society, Sep. 25, 2005, pp. 535-540, vol. 7, No. 4.

(Continued)

*Primary Examiner* — Kim Vu
*Assistant Examiner* — Michael Vanchy, Jr.
(74) *Attorney, Agent, or Firm* — The Webb Law Firm

(57) ABSTRACT

The objective is to provide a finger shape estimating device that can estimate the image most similar to a finger image quickly and with high precision, and that can facilitate construction of a database. Provided is a finger shape estimating device provided with a matching part that reads second shape data in a specific data set from a database that has multiple data sets in which finger angle data, second shape data relating to dimensions in the vertical direction and the horizontal direction of a second finger image of said finger, and second image feature quantities in the second finger image form a set, to match the second shape data and first shape data related to dimensions in the vertical direction and the horizontal direction in a separately acquired first finger image, and an estimating part that matches the second image feature quantities in the data set comprising the compatible second shape data, from matching by the matching part, with first image feature quantities in the first finger image, and estimates the finger shape in the first finger image.

16 Claims, 28 Drawing Sheets

(56) References Cited

U.S. PATENT DOCUMENTS

| | | | |
|---|---|---|---|
| 7,308,112 B2 * | 12/2007 | Fujimura et al. | 382/103 |
| 2005/0271279 A1 * | 12/2005 | Fujimura et al. | 382/203 |
| 2006/0161588 A1 | 7/2006 | Nomoto | |
| 2007/0078564 A1 | 4/2007 | Hoshino et al. | |
| 2008/0181459 A1 * | 7/2008 | Martin et al. | 382/103 |
| 2009/0006482 A1 | 1/2009 | Nomoto | |
| 2009/0102788 A1 * | 4/2009 | Nishida et al. | 345/158 |

OTHER PUBLICATIONS

Hoshino et al., "Copycat hand—robot hand imitating human motions at high speed and with high accuracy", Advanced Robotics, 2007, pp. 1743-1761, vol. 21, No. 15.

Tamaki et al., "3D estimation of human hand posture with wrist motions", IEICE Technical Report, 2007, pp. 59-62, vol. 107, No. 179.

* cited by examiner

LABELING NUMBER 1
LABELING NUMBER 3
LABELING NUMBER L-3
LABELING NUMBER L

BACKGROUND　HAND REGION

ONE PIXEL

FIG. 11

| IMAGE NUMBER | CHARACTERISTIC AMOUNT | | | | | TALLNESS $R_t$ | TOP-HEAVINESS $R_{th}$ | RIGHT-BIASNESS $R_{rb}$ | THUMB CM (FLEXION AND EXTENSION) | THUMB MP | THUMB IP | FORE-FINGER CM (ADDUCTION AND ABDUCTION) | MIDDLE FINGER | RING FINGER | LITTLE FINGER | FOREARM ROTATIONAL ANGLE |
|---|---|---|---|---|---|---|---|---|---|---|---|---|---|---|---|---|
| 1 | ... | 76 | 77 | ... | 1600 | 0.502604 | 0.740933 | 0.612565 | 33 | 12 | 18 | 18 | ... | ... | ... | 10 |
| | 0 | ... | 10 | 3 | ... | 0 | | | | | | | ... | ... | ... | |
| ... | ... | ... | ... | ... | ... | ... | ... | ... | ... | ... | ... | ... | ... | ... | ... | ... |

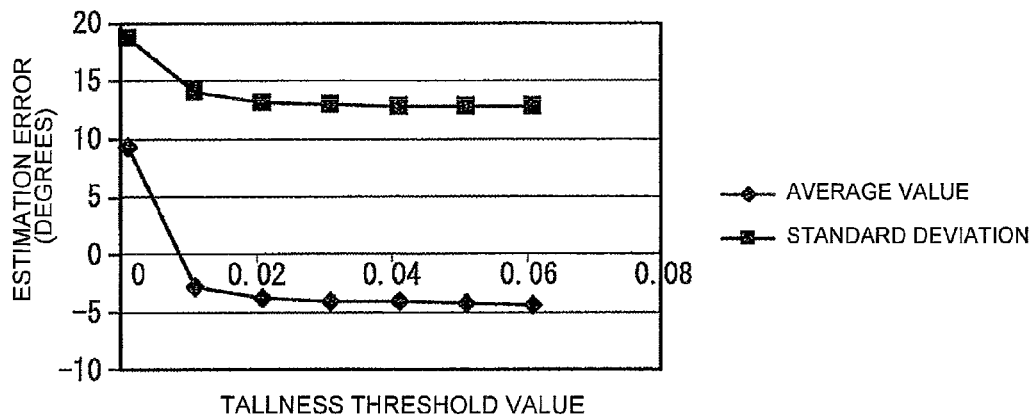
FIG. 15 TOP-HEAVINESS THRESHOLD VALUE 0.001
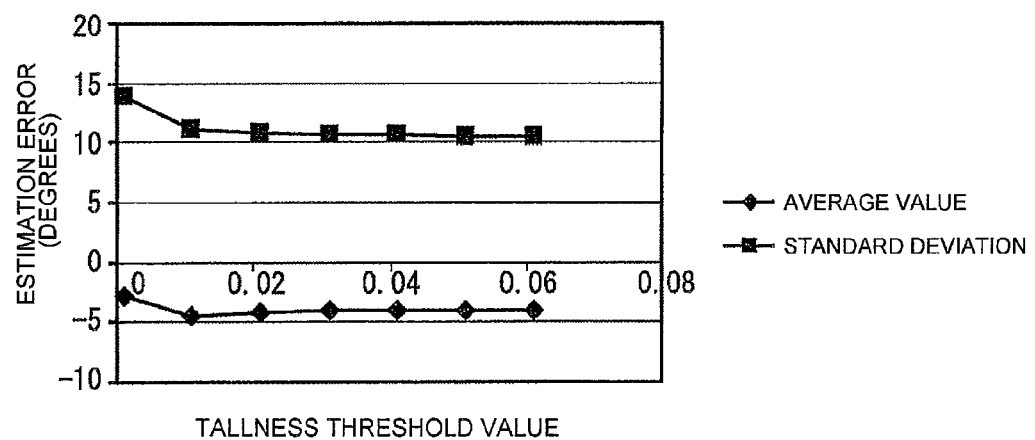
FIG. 16 TOP-HEAVINESS THRESHOLD VALUE 0.011
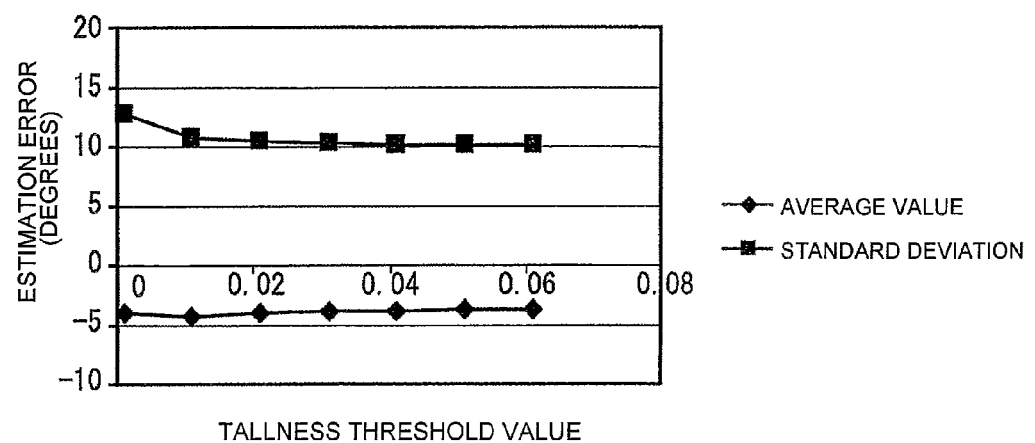
FIG. 17 TOP-HEAVINESS THRESHOLD VALUE 0.021

[図28]

[図29]

TILT OF FOREARM PORTION $\theta = (\theta a + \theta b)/2$

TILT $\theta_i = \tan^{-1}\left(\dfrac{y_{i+\Delta} - y_{i-\Delta}}{x_{i+\Delta} - x_{i-\Delta}}\right)$

DEVICE METHOD AND PROGRAM FOR HUMAN HAND POSTURE ESTIMATION

TECHNICAL FIELD

The present invention relates to a human hand posture estimating device and human hand posture estimating method which are suitable to estimate human hand posture from a hand image captured with camera(s) or the like, and a program which executes the method.

BACKGROUND ART

Recently, multi-fingered robotic hands having hands shaped like human hands have been developed. The human hand posture estimating technology is available as a technology needed at the time of driving hands of such a multi-fingered robotic hand or a technology needed at the time of inputting information into a computer through gestures or sign language motions. Conventionally, various technologies of estimating human hand posture have been proposed (see, for example, Patent Literatures 1 and 2, and Non-patent Literatures 1 and 2).

Patent Literatures 1 and 2, and Non-patent Literature 1 propose a human hand posture estimating method that saves sets of the amount of low-order image characteristics of hand images and joint angle data in a database beforehand, and collates an unknown hand image input from a camera with data contained in the database to search for similar images.

Non-patent Literature 2 proposes a scheme of searching for similar images based on positional information on finger nails in a hand image in addition to the image characteristic amount used in the human hand posture estimating method proposed in Patent Literatures 1 and 2, and Non-patent Literature 1.

To improve the accuracy of estimating human hand postures in the aforementioned human hand posture estimating technology, the scale of the database for hand images should be made larger. When the scale of the database becomes larger, however, retrieval takes time. To address this problem, Patent Literature 2 and Non-patent Literature 1 further propose a scheme of retrieving human hand postures similar to an unknown input image from a large-scale database at a high speed.

The human hand posture estimating method proposed in Patent Literature 2 and Non-patent Literature 1 will be described specifically referring to FIG. 41, FIGS. 42A and 42B, and FIGS. 43A and 43B. FIG. 41 is a schematic structural diagram of a database, FIGS. 42A and 42B, and FIGS. 43A and 43B are diagrams illustrating retrieval procedures for unknown sequential images input. For the sake of simplicity, the database is exemplified in two layers.

First, a multi-layer database as shown in FIG. 41 is created. It is to be noted however that at this time, a multi-layer database is created using self-organizing maps involving self-reproduction and self-quenching in such a way that similar human hand posture images are arranged close to one another and the quantities of data sets belonging to individual classes become approximately even.

Next, when a first unknown hand image (first image) is input, all the classes in the multi-layer database will be searched with respect to the first image as shown in FIG. 42A (search region 60 encircled by the dashed line in FIG. 42A). Then, joint angle data of a finger corresponding to the amount of characteristics most similar to the amount of characteristics of the first image in the target is output (arrow A1 in FIG. 42A).

Next, when an unknown hand image (second image) at the next time is input, as shown in FIG. 42B, classes in the vicinity of the class to which image data output in the search at the previous time (e.g., both adjacent classes) becomes the search target (search region 61 encircled by the dashed line in FIG. 42B) for the second image. When similar images are retrieved in the same class again in this search as shown in FIG. 42B (arrow A2 in FIG. 42B), retrieval is performed in the same search area 61 as shown in FIG. 42B for a hand image (third image) at the next time, as shown in FIG. 43A.

Then, suppose that in the retrieval of the third image, as shown in FIG. 43A, for example, similar images are retrieved in a class different from the class where the second image is detected (class adjacent on the right to the second image detecting class) (arrow A3 in FIG. 43A). In this case, search for a hand image (fourth image) at the next time is carried out with the search region (search class) shifted in such a way that the class where the third image is retrieved comes to the center of the search region (search region 62 encircled by the dashed line in FIG. 43B).

According to the technology proposed in Patent Literature 2 and Non-patent Literature 1, the search space can be narrowed and the processing time can be shortened by making data in the vicinity of the result of retrieval at one previous time the search target as mentioned above.

RELATED ART LITERATURES

Patent Literatures

Patent Literature 1: International Publication No. WO2005/046942
Patent Literature 2: Japanese Patent Application Laid-Open Publication No. 2006-294018

Non-Patent Literatures

Non-patent Literature 1: K. Hoshino, E. Tamaki, and T. Tanimoto: Copycat hand—Robot hand imitating human motions at high speed and with high accuracy, Advanced Robotics, Vol. 21, No. 15, pp. 1743-1761, 2007
Non-patent Literature 2: Emi Tamaki, Kiyoshi Hoshino: "3D Estimation of human hand posture with Wrist Motions", IEICE Report WIT, Vol. 107, No. 179, pp. 59-62, 2007

DISCLOSURE OF INVENTION

Problems to be Solved by the Invention

The aforementioned scheme of retrieving similar image from a database having a multi-layer structure has the following drawbacks.

(1) Since proximity data of the results of search at one previous time is the search target, when the human hand posture significantly changes between sequential hand images, human hand posture similar to the human hand posture to be retrieved may be eliminated from the search region. In this case, the most similar image may not be found out.

(2) Even if the human hand posture is changing slowly between sequential hand images, an error may enter the estimation, so that once non-similar image is output, search is performed at classes near the class including the non-similar image in the search of a hand image at the next and following times. It is therefore very likely that non-similar images are continuously output.

(3) According to the conventional scheme, the database is not created in multi-layer structure based only on the statistical similarity, but the database is effectively created in multilayer structure using priori knowledge. It is therefore difficult to decide what kind of data corresponding to the human hand posture of a hand image, such as image characteristic amount, joint angle information, and finger nail position information, should be assigned to the individual classes of each layer which has typical values. Consequently, it takes a lot of manpower to create the database.

The present invention has been made to overcome the aforementioned problems, and it is an object of the invention to estimate the most similar image to a hand image fast and with high accuracy, and to easily create a database in a human hand posture estimating device, human hand posture estimating method and a program which executes the method.

It is another object of the invention to provide a human hand posture estimating device, human hand posture estimating method and a program which executes the method, which can estimate a human hand posture and the tilt of a forearm portion even when the direction of extension of the forearm portion of the hand image whose posture is to be estimated is not facing a predetermined direction, i.e., even when a user freely moves an upper limb.

It is a further object of the invention to provide a human hand posture estimating device, human hand posture estimating method and a program which executes the method, which can stably estimate a shape regardless of whether the position of a hand to be captured is close to or far from a camera.

Means for Solving the Problems

To overcome the problems, a human hand posture estimating device according to the invention is configured to include a hand image acquiring section that acquires a first hand image, and a shape data calculating section that calculates first shape data on vertical and horizontal sizes of the first hand image. The invention is configured to include a collation section that reads second shape data in a predetermined data set from a database holding a plurality of data sets each having a set of angle data of a finger, second shape data on vertical and horizontal sizes of a second hand image acquired by capturing an image of the hand, and a second image characteristic amount of the second hand image, and collates the second shape data with the first shape data. Further, the invention is configured to include an estimation section that collates the second image characteristic amount in the data set which contains second shape data matched in collation performed by the collation section with the first image characteristic amount to estimate a human hand posture of the first hand image.

According to the invention, the vertical and horizontal sizes of a first hand image acquired by the hand image acquiring section, i.e., first shape data on the entire shape of the first hand image is collated with second shape data of a second hand image in the database by the collation section. Hereinafter, this process is also called "first estimation process". Next, a second image characteristic amount which is in a set with the second shape data that is matched in the collation in the first estimation process is collated with a first image characteristic amount of the first hand image to estimate a human hand posture. Hereinafter, this process is also called "second estimation process". That is, a human hand posture is estimated in a two-step estimation process according to the invention.

Effect of the Invention

According to the human hand posture estimating device and human hand posture estimating method of the invention, similar images are retrieved based on the characteristics of the entire shape of a hand image in the first estimation process to reduce the quantity of image data to be collated (quantity of data sets) to be similar image candidates to a certain number. As a result, it is possible to reduce the amount of search (process amount) at the time of executing detailed similarity collation in the second estimation process. Therefore, the invention can ensure fast search for a most similar image even when a large-scale database is used.

In addition, according to the invention, a most similar image can be found without using the result of search for hand images at a previous time, at the time of retrieving sequential hand images. According to the invention, therefore, a most similar image can be retrieved with high accuracy regardless of the speed of a change in a human hand posture between sequential hand images, or without an influence of an error if contained in the previous estimation results.

Further, according to the invention, a database holding a plurality of data sets each having a set of angle data of fingers, second shape data indicating the characteristics of the entire shape of a second hand image acquired by capturing the images of the hands, and a second image characteristic amount of the second hand image has only to be created. Unlike the related art, therefore, the invention need not create a multi-layer database in such a way that images of similar human hand postures are placed close to one another, thus simplifying creation of the database.

According to the invention, when the hand image acquiring section includes a tilt calculating section that calculates tilt of a forearm portion in an original image of the first hand image, and an image correcting section that rotates the first hand image based on the tilt of the forearm portion calculated by the tilt calculating section in such a way that the direction of extension of the forearm portion faces a predetermined direction, it is possible to estimate a human hand posture and the tilt of the forearm portion even when the direction of extension of the forearm portion whose shape is to be estimated, i.e., even when a user has freely moved an upper limb.

Further, according to the invention, when an extracted hand image is normalized to an image with a predetermined size of pixels at the time of calculating the first image characteristic amount of the first hand image and the second image characteristic amount of the second hand image, the human hand posture can be estimated stably regardless of whether the position of a hand whose image is to be captured is close to or far from a camera.

BRIEF DESCRIPTION OF DRAWINGS

FIG. 11 shows one structural example of a data set.

FIG. 15 is a diagram showing the relation among three threshold values on tallness, top-heaviness and right-biasness, and the average value and standard deviation of estimation errors.

FIG. 16 is a diagram showing the relation among the three threshold values on tallness, top-heaviness and right-biasness, and the average value and standard deviation of estimation errors.

FIG. 17 is a diagram showing the relation among the three threshold values on tallness, top-heaviness and right-biasness, and the average value and standard deviation of estimation errors.

BEST MODE FOR CARRYING OUT THE INVENTION

One embodiment of the present invention will be described below with reference to the accompanying drawings. It is to be noted that the invention is not limited to the following embodiment.

[Device Configuration]

Figure 1:
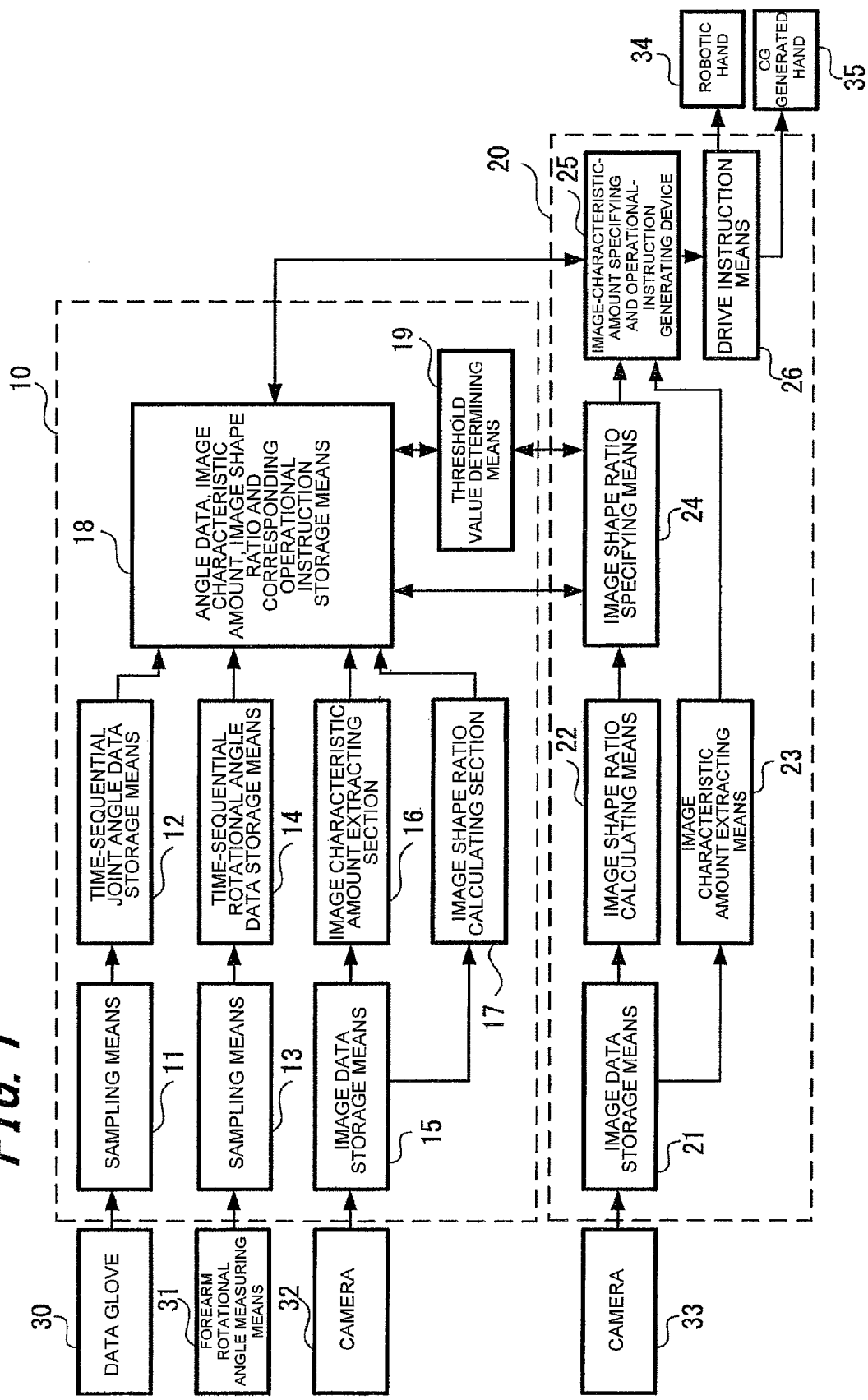
FIG. 1 is a configuration diagram of a system to which a human hand posture estimating device according to an embodiment of the invention is adapted.

FIG. 1 is a configuration diagram of a system to which a human hand posture estimating device according to the embodiment is adapted. The system in FIG. 1 uses the human hand posture estimating device according to the embodiment to control a robotic hand 34 and a three-dimensional Computer Graphics generated CG hand 35.

As shown in FIG. 1, the system in FIG. 1 includes a database creating device 10 which calculates and stores various kinds of data on human hand posture, and a human hand posture estimating device 20 which estimates a human hand posture from a captured image.

The database creating device 10 includes sampling means 11 and 13, time-series joint angle data storage means 12, and time-series rotational angle data storage means 14, as shown in FIG. 1. The database creating device 10 also includes image data storage means 15, an image characteristic amount extracting section 16, and an image shape ratio calculating section 17. The database creating device 10 further includes storage means 18 where angle data, image characteristic amounts (second image characteristic amounts), image shape ratios (second shape data), and operational instructions are stored (hereinafter also called "database 18"), and threshold value determining means 19 (threshold value calculating device). The following will briefly describe the functions of the individual means that constitute the database creating device 10.

The sampling means 11 samples angle data of individual joints of each finger, output from a data glove 30, in a predetermined cycle, and outputs the sampled angle data to the time-series joint angle data storage means 12. Then, the time-series joint angle data storage means 12 stores the sampled angle data of the individual joints of each finger.

The sampling means 13 samples rotational angle data of a forearm (wrist), output from forearm rotational angle measuring means 31, in a predetermined cycle, and outputs the sampled rotational angle data to the time-series rotational angle data storage means 14. Then, the time-series rotational angle data storage means 14 stores the sampled rotational angle data of the forearm (wrist).

The image data storage means 15 not only stores images captured by a camera 32, but also extracts a hand image (second hand image) within a predetermined range, which is needed to calculate the image shape ratio and image characteristic amount of a hand, from the captured images. The image characteristic amount extracting section 16 divides the hand image extracted by the image data storage means 15 into a predetermined number of segments, and calculates the amounts of characteristics of the individual segment images (specifically, higher-order local autocorrelation function to be described later). The image shape ratio calculating section 17 calculates an image shape ratio indicating the characteristic of the entire shape of a hand image (specifically, tallness, top-heaviness and right-biasness to be described later) from the hand image extracted by the image data storage means 15.

The database 18 stores a data set having a set of joint angle data of a finger, rotational angle data of a forearm (wrist), image shape ratio and an image characteristic amount, which are acquired for a single human hand posture. Data sets respectively corresponding to various human hand postures are stored in the database 18. According to the embodiment, more than 20,000 data sets are stored in the database 18.

The threshold value determining means 19 calculates decision parameters (threshold values), which are used at the time of collating an image shape ratio in a data set with the image shape ratio of a hand image acquired by the human hand posture estimating device 20, in a first estimation process performed by the human hand posture estimating device 20. Specifically, the threshold value determining means 19 determines threshold values for determining whether or not the difference between the image shape ratio in the data set (second shape data) and the image shape ratio of the hand image acquired by the human hand posture estimating device 20 (first shape data) lies within a predetermined range.

Figure 2:
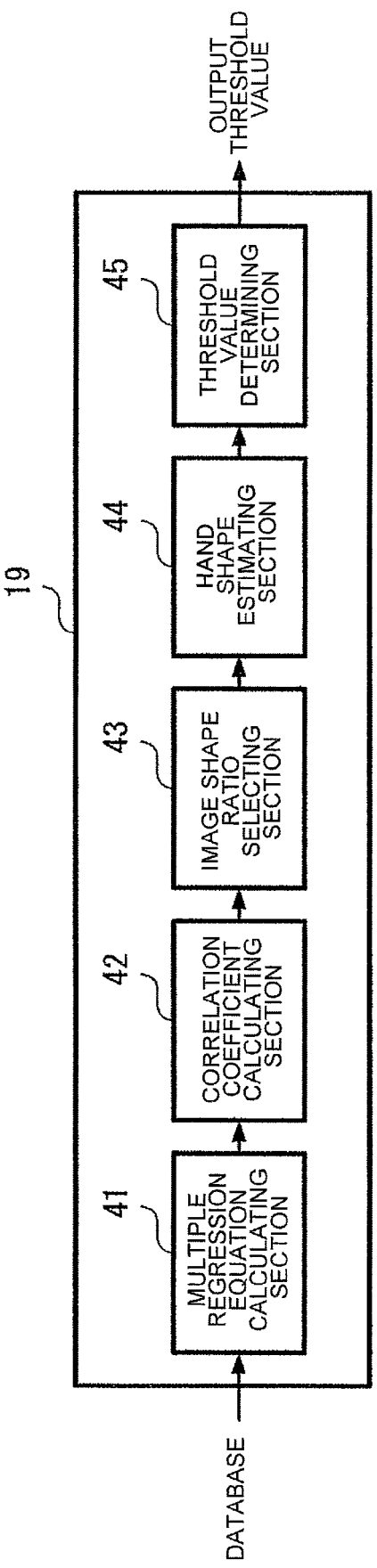
FIG. 2 is a block configuration diagram of threshold value determining means according to the embodiment of the invention.

The specific configuration of the threshold value determining means 19 will now be described referring to FIG. 2. FIG. 2 is a block configuration diagram of the threshold value determining means 19. As shown in FIG. 2, the threshold value determining means 19 includes a multiple regression equation calculating section 41, a correlation coefficient calculating section 42, an image shape ratio selecting section 43 (selecting section), a human hand posture estimating section 44, and a threshold value determining section 45. The following will describe the functions of the individual sections.

The multiple regression equation calculating section 41 creates a multiple regression equation having an image shape ratio stored in the database 18 as an dependent variable and joint angle data (finger joint angle data and rotational angle data of a forearm (wrist)) as an explanatory variable for each image shape ratio. The correlation coefficient calculating section 42 calculates the multiple correlation coefficient of each image shape ratio using the multiple regression equation calculated by the multiple regression equation calculating section 41. Based on the result of calculation performed by the correlation coefficient calculating section 42, the image shape ratio selecting section 43 selects an image shape ratio which has a significant influence on estimation of a human hand posture.

The human hand posture estimating section 44 estimates a human hand posture by varying the threshold values on the image shape ratio selected by the image shape ratio selecting section 43. The human hand posture estimating section 44 has a function similar to the estimation function (second estimation process) of the human hand posture estimating device 20, which will be described later. The threshold value determining section 45 determines threshold values on each image shape ratio based on the result of the estimation performed by the human hand posture estimating section 44.

Returning to FIG. 1, the human hand posture estimating device 20 includes image data storage means 21 (hand image acquiring section), an image shape ratio calculating section 22 (shape data calculating section), and an image characteristic amount extracting section 23. The human hand posture estimating device 20 also includes image shape ratio specifying means 24 (collation section), an image-characteristic-amount specifying and operational-instruction generating device 25 (estimation section), and drive instruction means 26. The following will briefly describe the functions of the individual means that constitute the human hand posture estimating device 20.

The image data storage means 21 (hand image acquiring section) not only stores images captured by a camera 32, but also extracts a hand image (first hand image) within a predetermined range, which is needed to calculate the image shape ratio (first shape data) and image characteristic amount (first image characteristic amount) of a hand, from the captured images. The image shape ratio calculating section 22 calculates an image shape ratio indicating the characteristic of the shape of a hand image (specifically, tallness, top-heaviness and right-biasness to be described later) from the hand image extracted by the image data storage means 21. The image characteristic amount extracting section 23 divides the hand image extracted by the image data storage means 21 into a predetermined number of segments, and calculates the amounts of characteristics of the individual segment images (specifically, higher-order local autocorrelation function to be described later).

The image shape ratio specifying means 24 (hereinafter also called "collation means 24") reads image shape ratio data in a data set stored in the database 18, and collates the image shape ratio data with the image shape ratio data calculated by the image shape ratio calculating section 22. That is, the collation means 24 performs the first estimation process. When the image shape ratio data read from the database 18 matches with the image shape ratio data calculated by the image shape ratio calculating section 22, the collation means 24 outputs the number of the data set that contains the image shape ratio data read from the database 18.

Based on the data set number output from the collation means 24, the image-characteristic-amount specifying and operational-instruction generating device 25 (hereinafter also called "estimation means 25") reads an image characteristic amount (second image characteristic amount) in the data set with that number, and collates the image characteristic amount with the image characteristic amount (first image characteristic amount) of the input image, which is extracted by the image characteristic amount extracting section 23. That is, the estimation means 25 performs the second estimation process. This estimation process specifies the human hand posture (finger joint angle, rotational angle of the forearm (wrist)) in the data set which is most similar to the human hand posture of the input image. Then, the estimation means 25 outputs the specified finger joint angle and rotational angle of the forearm (wrist) to the drive instruction means 26 as an operational instruction to the robotic hand 34 or the CG generated hand 35.

The drive instruction means 26 sends the operational instruction input from the estimation means 25 to the robotic hand 34 or the CG generated hand 35 to drive the robotic hand 34 or the CG generated hand 35.

Although the database 18 is separate from the human hand posture estimating device 20 according to the embodiment, the human hand posture estimating device 20 may include the database 18. Further, although the threshold value determining means 19 is separate from the human hand posture estimating device 20 according to the embodiment, the human hand posture estimating device 20 may include the threshold value determining means 19. In this case, the estimation function of the threshold value determining means 19 and the estimation function of the human hand posture estimating device 20 may be made common to each other.

[Creation of Database]

Figure 3:
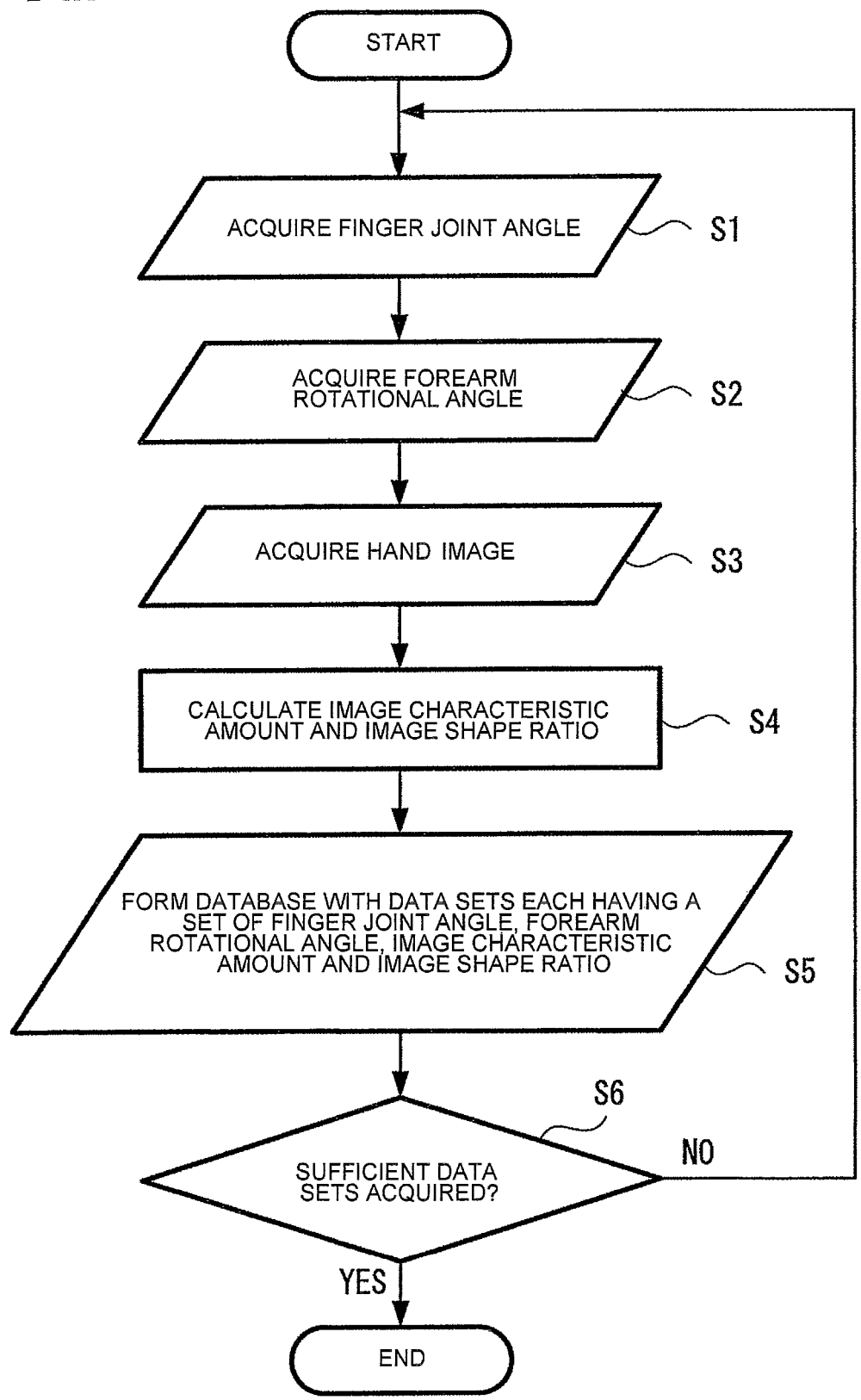
FIG. 3 is a flowchart illustrating procedures of creating a database.

The procedures of creating the database according to the embodiment will be described referring to FIGS. 3 to 11. It is to be noted that the reference numerals of the individual devices and means in the following description are the same as those given to the individual sections in FIG. 1. First, the general procedures of creating the database according to the embodiment will be described referring to FIG. 3. FIG. 3 is a flowchart illustrating the general flow of the procedures of creating the database 18. The process in steps S1 to S3 in FIG. 3 can be executed in the order illustrated in FIG. 3, but may be executed in parallel.

First, the time-series joint angle data storage means 12 acquires time-sequential data on the angles of the joints of a finger from the data glove 30 (Cyber Glove (Registered Trademark) of Virtual Technologies. Inc.) via the sampling means 11 (step S1). The data on the finger joint angles are acquired with the data glove 30 put on a hand. The data glove 30 is provided with sensors which detect the angles of individual joints of a finger at positions equivalent to the individual joints of the finger. To detect the motion of a wrist, sensors are provided at the portion of the palm of the hand. A strain sensor is used as the sensor.

The data glove 30 which is used in the embodiment can output 24 kinds of angle information on finger joints. Specifically, the following finger joint angle information can be output. The output of angle data on the wrist becomes available in combination with magnetic motion capture.

Flexion and extension of three joints of the thumb (CM (Carp Metacarpal) joint of the thenar eminence (soft portion of the palm at the base of the thumb), MP (Meta Carpophalangeal) joint, IP (Interphalangeal) joint): three kinds in total Flexion and extension of three joints of four fingers other than the thumb (MP joint, PIP (Proximal Interphalangeal) joint, and DIP (Distal Interphalangeal) joint as located from the base side of each finger): twelve kinds in total Abduction and adduction (tilting toward the little finger or the thumb) of bottom joints of four fingers other than the middle finger (MP of three fingers and CM of the thumb): four kinds in total Adduction and abduction (tilting toward the thumb or the little finger) and flexion and extension (bending toward the palm or the back of the hand) of the wrist three joints of four fingers other than the middle finger (MP of three fingers and CM of the thumb): two kinds in total Three Kinds of Unused Information The data glove 30 used in the embodiment acquires the angle of the DIP joint of each finger in terms of the angle of the PIP joint. Therefore, the substantial number of degrees of freedom of the data glove 30 becomes 17 (=24 kinds−three kinds of unused information−four kinds of DIP joint information of four fingers which are not actually measured). That is, according to the embodiment, the number of kinds of joint data which are actually measured by the data glove 30 and used is 17.

Next, the time-series rotational angle data storage means 14 acquires time-series data on the joint angle of the forearm (wrist) from the forearm rotational angle measuring means 31 via the sampling means 13 (step S2). According to the embodiment, a USB (Universal Serial Bus) camera is used as the forearm rotational angle measuring means 31. An optical reference mark (e.g., light rod) is put on the wrist portion of the data glove 30, and the image of the hand is captured with the USB camera 31 set above the hand wearing the data glove 30. Then, the rotational angle of the forearm is measured based on the rotational angle of the reference mark in the captured image. The invention is not limited to this example; for example, magnetic motion capturing sensors may be mounted to the data glove 30 to acquire data on the rotational angle of the wrist.

Next, the image data storage means 15 acquires the image captured by the camera 32, and stores the image (step S3). According to the embodiment, a USB camera is used as the camera 32, and the hands with the data glove 30 put thereon were captured with the USB camera. At this time, the images of the hands were captured with the resolution of 320×240 pixels and the hands being shown in the screen in a sufficiently large size. If the image of the hand wearing the data glove 30 is captured directly, the image data may contain unique image characteristics such as texture and color shade of the data glove 30, producing an estimation error. In this respect, according to the embodiment, a thin white glove is put on the data glove 30 in capturing an image. According to the embodiment, a black screen was used for the background at the time of acquiring a hand image, finger joint angles and wrist rotation angle.

In step S3, a hand image (second hand image) in a predetermined range which is needed to calculate the image shape ratio and image characteristic amount of a hand is extracted from the captured image.

Next, the image characteristic amount extracting section 16 and the image shape ratio calculating section 17 respectively calculate the image characteristic amount and the image shape ratio of the hand image using the hand image acquired (extracted) in step S3 (step S4). The process of extracting the hand image (second hand image) from the captured image and the process of step S4 will be described in detail later referring to FIGS. 4 and 5.

Next, the finger joint angle, the data set having a set of the forearm (wrist) rotation angle, the image shape ratio, and the image characteristic amount acquired in the steps S1 to S4 is stored in the database 18 (step S5).

Next, it is determined whether or not the quantity of data sets stored in the database 18 is equal to or greater than a desired quantity (quantity needed in estimating a human hand posture) (step S6). When the desired quantity of data sets are stored in the database 18 (Yes in step S6), the process of creating the database 18 is terminated. When the desired quantity of data sets are not stored in the database 18 (No in step S6), steps S1 to S5 are repeated to acquire a data set corresponding to another human hand posture.

[Extraction of Hand Image, and Calculation of Image Characteristic Amount and Image Shape Ratio]

Figure 4:
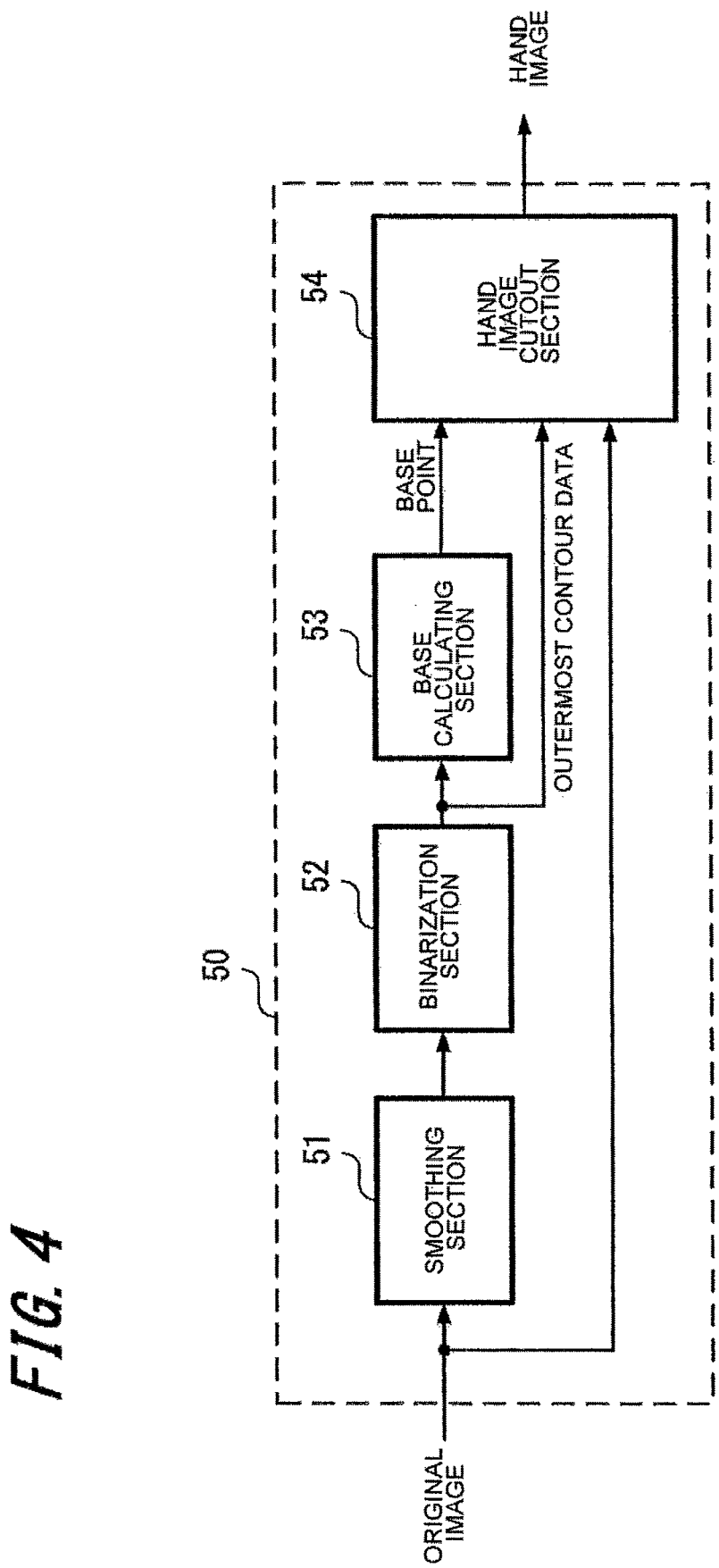
FIG. 4 is a block configuration diagram of a hand image extracting section.
Figure 5:
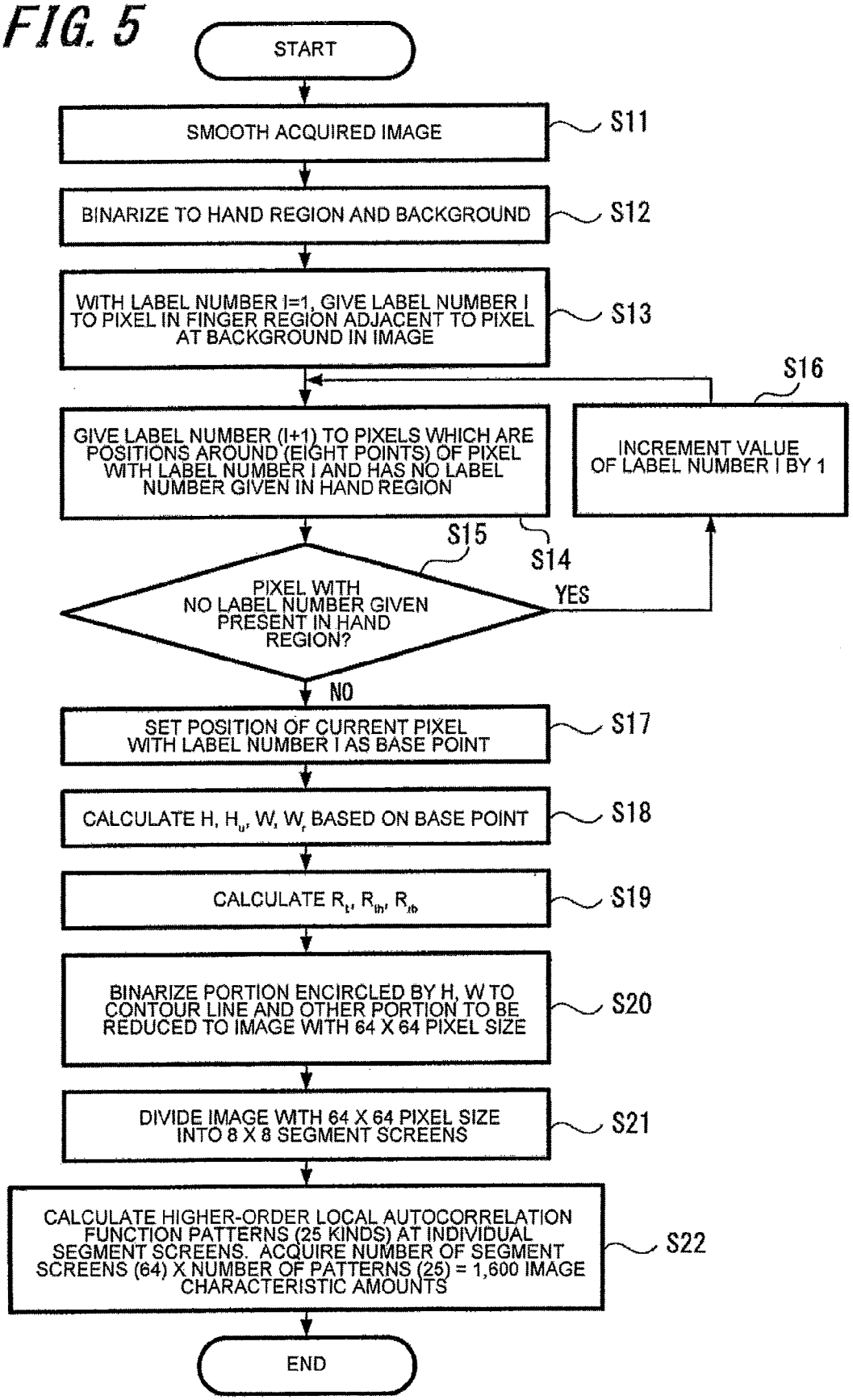
FIG. 5 is a flowchart illustrating procedures of calculating an image shape ratio and an image characteristic amount.

Next, referring to FIGS. 4 and 5, a description will be given of the process of extracting a hand image from the captured image in step S3 in FIG. 3 and the process of calculating the image characteristic amount and the image shape ratio in step S4. FIG. 4 is a block configuration diagram of the hand image extracting section which extracts a hand image from the captured image, and FIG. 5 is a flowchart illustrating procedures from the process of extracting a hand image to the process of calculating the image characteristic amount and the image shape ratio.

Before describing the specific process procedures of steps S3 and S4 in FIG. 3, the configuration of a hand image extracting section 50 which extracts a hand image from the captured image will be briefly described referring to FIG. 4. As mentioned above, the image data storage means 15 (hand image acquiring section) extracts a hand image in a predetermined range which is needed to calculate the image shape ratio and image characteristic amount of a hand from the image captured by the camera 32. Accordingly, the hand image extracting section 50 is included in the image data storage means 15.

The hand image extracting section 50 has a smoothing section 51, a binarization section 52, a base calculating section 53, and a hand image cutout section 54, which are connected in the named order from the input side of the original image (captured image). The individual sections function as follows. The smoothing section 51 cancels noise from the captured image. The binarization section 52 (outermost contour extracting section) binarizes the noise-canceled original image with the hand region and the background. The base calculating section 53 (base extracting section) acquires a reference point (base point) in the hand image at the time of acquiring the image shape ratio in step S4 in FIG. 3. According to the embodiment, as will be described later, a pixel (base pixel) to be a base point in the hand image is acquired through a labeling process of giving label numbers to the pixels in order from the outermost contour pixel in the hand region. The hand image cutout section 54 cuts out a hand image in a predetermined range from the original image based on the data on the outermost contour pixel in the hand region acquired by the binarization section 52 and the base point in the hand image which is acquired by the base calculating section 53. The image data storage means 21 of the human hand posture estimating device 20, like the image data storage means 15, also has the aforementioned hand image extracting section 50.

Next, specific process procedures of steps S3 and S4 in FIG. 3 will be described referring to FIG. 5. First, the captured image acquired in step S3 in FIG. 3 is subjected to a smoothing process (filtering process) in the smoothing section 51 in the hand image extracting section 50 to cancel noise (step S11). Next, the binarization section 52 binarizes the captured image with the hand region and the background (step S12). Accordingly, the outermost contour pixel of the hand region (hand portion) can be acquired.

Next, the base calculating section 53 gives a label number "1" to a pixel (outermost contour pixel) in the hand region adjacent to the pixel of the background in the captured image acquired in step S12 (step S13). Then, the base calculating section 53 gives a label number "2" to a pixel which has no label number given and is adjacent to the pixel with the label number "1" (step S14). Then, it is determined whether or not there is a pixel having no label number in the hand region (step S15).

When there is a pixel having no label number in the hand region (Yes in step S15), the label number is incremented by "1" (step S16), and the process of step S14 is carried out.

When a pixel having no label number is not present in the hand region (No in step S15), the position of the last pixel to which the label number has been given is set as the base point of the hand image which is needed at the time of acquiring the image shape ratios (tallness, top-heaviness, right-biasness, etc.) to be described later. It is to be noted that the base point calculating process in the steps S13 to S17 is carried out in the base calculating section 53.

Figure 6A:
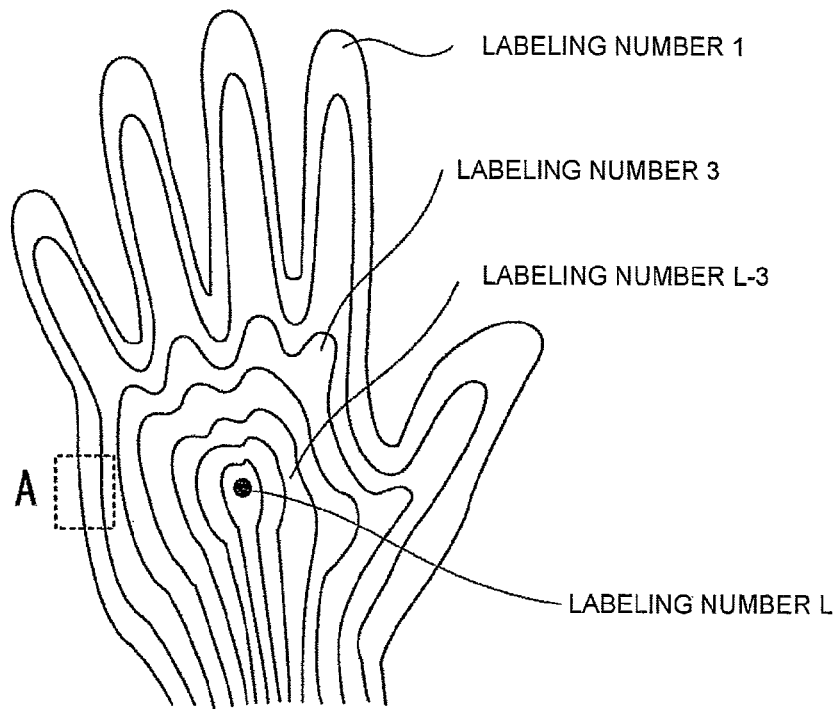
FIG. 6A is a diagram showing how to determine a base point in a hand image.
Figure 6B:
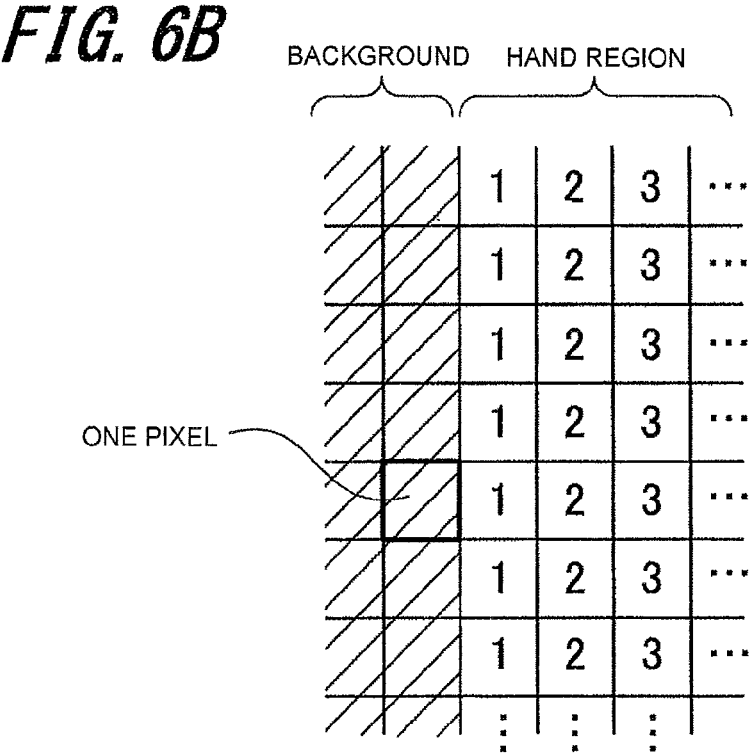
FIG. 6B is an enlarged view of a dashed-line region A in FIG. 6A.
Figure 7A:
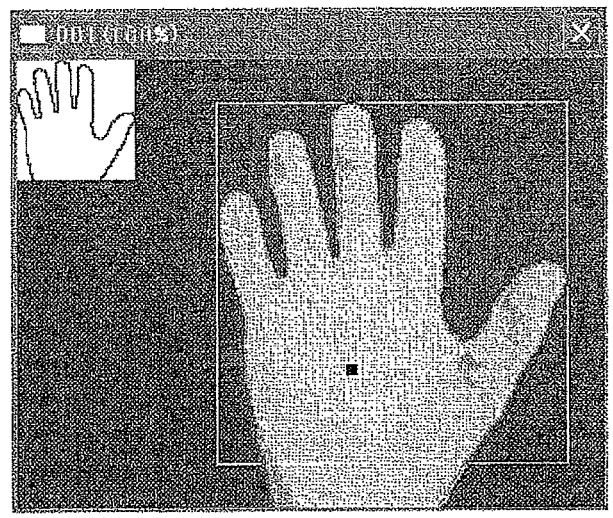
FIGS. 7A to 7C are diagrams showing cutout examples of an extracted hand image.
Figure 7B:
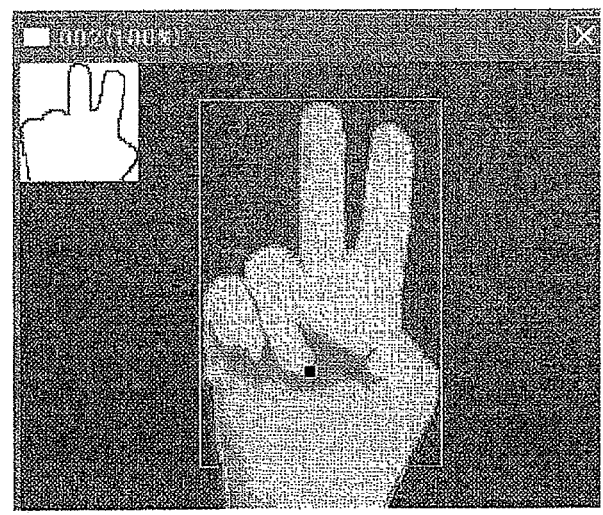
Figure 7C:
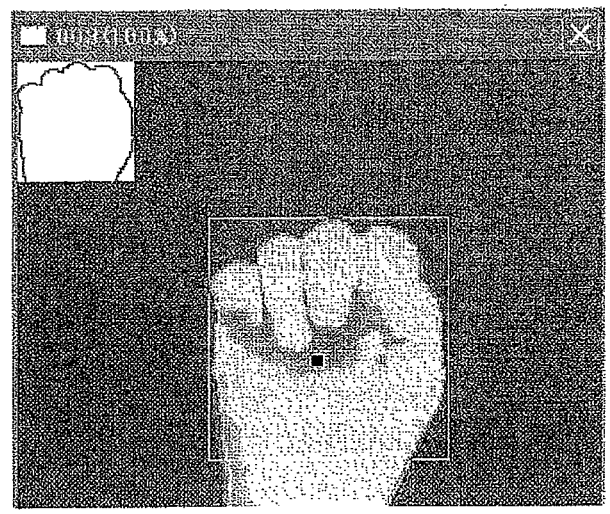

FIGS. 6A and 6B show how the process operation in the steps S13 to S17 is carried out. FIG. 6A is a diagram showing that pixels with the same label number in the captured image are connected by a line, and FIG. 6B is an enlarged view of a dashed-line region A in FIG. 6A.

The label numbers of pixels, 1, 2, 3, so forth, are given to the pixels in the hand region in order from the outermost contour pixel of a hand through the process operation in steps S13 to S17 as shown in FIG. 6B. As a result, with the pixels with the same label number being connected by a line, when the label number becomes larger, the region encircled by the line is formed more inward in the hand region while its range becomes narrower. Finally, the region formed by connecting the pixels with the same label number converges to a single pixel (pixel with the largest label number) (pixel with a label number "L" in FIG. 6A). According to the embodiment, the position of this pixel is set as the base point of the hand image.

Next, based on the base point of the hand image and the outermost contour (hand contour) of the hand region which are acquired in step S17, the image shape ratio calculating section 17 cuts out a hand image (second hand image: hereinafter also called "extracted hand image") in the range which is needed to calculate the image shape ratio from the captured image as follows.

To begin with, the upper end, the left end and the right end of the extracted hand image are the uppermost pixel and pixels in the line thereof, the leftmost pixel and pixels in the column thereof, and the rightmost pixel and pixels in the column thereof, of the hand contour, respectively. The bottom end of the extracted hand image is determined as mentioned below. First, the number of pixels, M, in the outermost contour pixels of a hand up to the nearest pixel from the base point is acquired. Then, the position of the pixel located under the base point by the pixel number M is set as the lower end of the extracted hand image. The extracted hand image is cut out from the captured image based on the upper and lower ends and the left and right ends of the extracted hand image acquired this way. Examples of extracted hand images cut out with respect to various human hand postures are shown in FIGS. 7A to 7C and FIGS. 8A to 8C. Regions encircled by white frames in FIGS. 7A to 7C and FIGS. 8A to 8C represent the ranges of the extracted hand images. Black rectangular marks given in the hand regions in FIGS. 7A to 7C and FIGS. 8A to 8C indicate the positions of the base points of the hand images. The cutout range for an extracted hand image is not limited to the examples, and may be adequately changed in consideration of the application, the required accuracy or the like.

Figure 9:
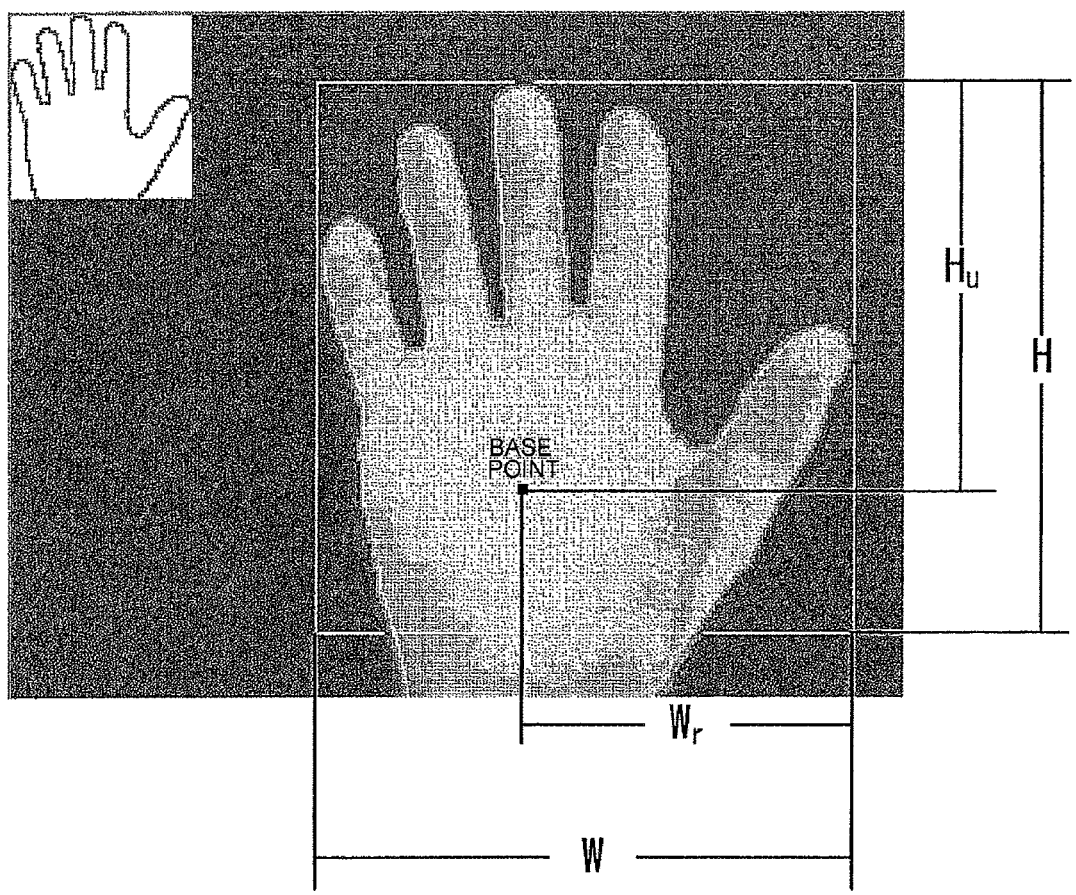
FIG. 9 is a diagram specifically showing definitions of shape parameters of an extracted hand image.

Next, the image shape ratio calculating section 17 calculates the total number of vertical pixels, H, in the extracted hand image, the total number of horizontal pixels, W, in the extracted hand image, the number of pixels, $H_u$, from the base point in the extracted hand image to the upper end thereof, and the number of pixels, $W_r$, from the base point in the extracted hand image to the right end thereof from the acquired extracted hand image and base point (step S18). FIG. 9 specifically shows the definitions of those pixel number parameters.

Next, using the shape parameters H, $H_u$, W and $W_r$ of the extracted hand image, the image shape ratio calculating section 17 calculates shape data indicating the characteristics of the entire shape of the extracted hand image (step S19). According to the embodiment, the following three parameters are used as shape data indicating the characteristics of the entire shape of the extracted hand image.

(1) tallness: $R_t[j]=H[j]/(H[j]+W[j])$
(2) top-heaviness: $R_{th}[j]=H_u[j]/H[j]$
(3) right-biasness: $R_{rb}[j]=W_r[j]/W[j]$ where the variable j in the parentheses is the number of a data set stored in the database 18. That is, for example, $R_t[j]$ is the tallness in the data set with the number j.

According to the embodiment, as described above, shape data in use includes the shape ratio (first shape ratio), like the tallness $R_t$, acquired from the total number H of vertical pixels in the extracted hand image and the total number W of horizontal pixels in the extracted hand image, and the shape ratio (second shape ratio), like the top-heaviness $R_{th}$ and the right-biasness $R_{rb}$, acquired based on the positional relation between the base point and the pixel at the outer end of the extracted hand image.

Note that shape data indicating the characteristics of the entire shape of the extracted hand image is not limited to the aforementioned three parameters, and the following parameters (4) to (7) may be used.

(4) ratio (left-biasness) of the number of pixels from the base point to the left end of the extracted hand image to the total number W of horizontal pixels in the extracted hand image
(5) ratio (aspect ratio) of the total number H of vertical pixels in the extracted hand image to the total number W of horizontal pixels in the extracted hand image
(6) ratio (top-bottom ratio) of the number of pixels from the base point to the upper end of the extracted hand image to the number of pixels from the base point to the lower end of the extracted hand image
(7) ratio (left-right ratio) of the number of pixels from the base point to one side end of the extracted hand image to the number of pixels from the base point to the other side end of the extracted hand image Shape data indicating the characteristics of the entire shape of the extracted hand image is not limited to the parameters (1) to (7), and arbitrary parameters indicating the characteristics of the entire shape of the extracted hand image can be used.

Figure 10B:
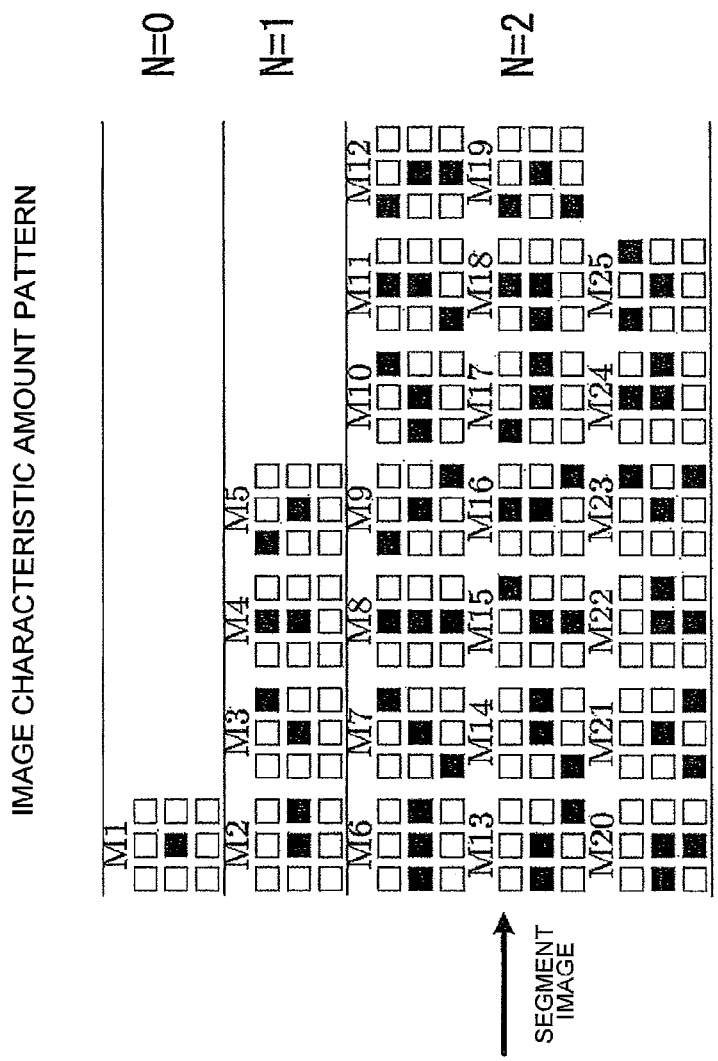
FIG. 10B is a diagram of higher-order local autocorrelation function patterns.
Figure 10A:
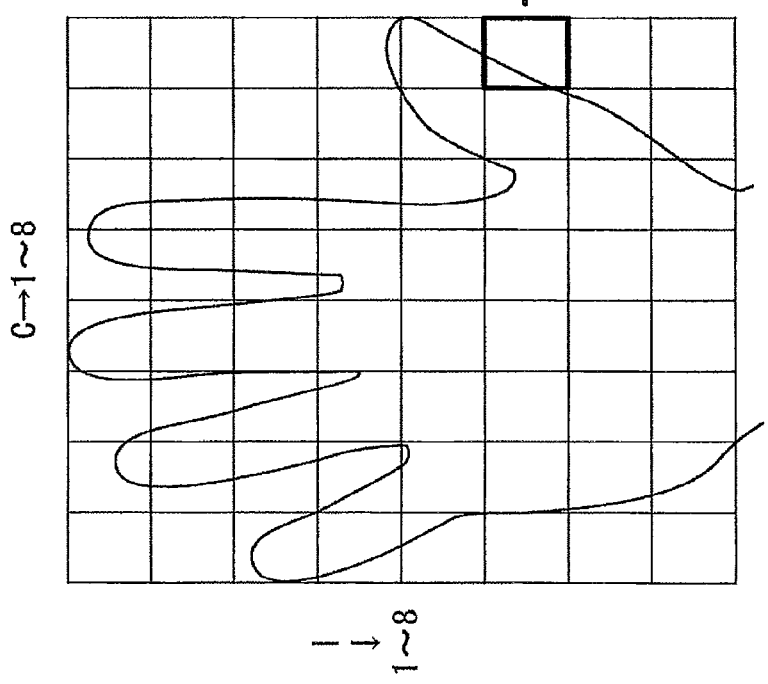
FIG. 10A is a diagram illustrating a process of extracting an image characteristic amount of an extracted hand image.

Next, the image characteristic amount extracting section 16 binarizes the extracted hand image, extracted by the hand image extracting section 50 in the image data storage means 15, into the contour line of a hand and the other portion, and reduces (normalizes) the extracted hand image to an image with 64×64 pixels (step S20). A hand image shown in a separate frame at the upper left portion of the hand image in each of FIGS. 7A to 7C, FIGS. 8A to 8C and FIG. 9 is the reduced image. Then, the image characteristic amount extracting section 16 divides the reduced extracted hand image by eight vertically and eight horizontally (a total of 64 segments) as shown in FIG. 10A (step S21).

Then, the image characteristic amount extracting section 16 calculates the image characteristic amount in each segment image divided in step S21 (step S22). According to the embodiment, a higher-order local autocorrelation function (higher-order local autocorrelation characteristic) which is widely used in image analysis in image recognition, measurement or the like is used as the image characteristic amount of a hand which is used in searching for similar images.

The higher-order local autocorrelation function is the calculated correlation between a reference point and its vicinity. Given that the reference point is r and the value of the pixel at the reference point is f(r), an n-th local autocorrelation function $x^N$ in the vicinity of the reference point r is defined by the following equation with respect to N displacement directions $a_1, a_2, \ldots, a_N$ in the vicinity of the reference point r.

$$x^N(a_1,a_2,\ldots,a_N)=\int f(r)f(r+a_1)\ldots f(r+a_N)dr \quad [\text{Eq. 1}]$$

When a natural image is processed using the higher-order local autocorrelation function, pixels around the reference point generally become important. According to the embodiment, therefore, the order N in the higher-order local autocorrelation function (image characteristic amount) is set to "2". According to the embodiment, the displacement directions are limited to a local region of 3×3 pixels around the reference point r. In this case, as shown in FIG. 10, the image characteristic amount is expressed by 25 kinds of patterns (M1 to M25 in FIG. 10B) like a dot, a line, and a broken line, excluding an equivalent characteristic amount originated from parallel movement. Black rectangles in FIG. 10B indicate the layout of pixels corresponding to a local pattern.

Calculation of each characteristic amount is carried out by summing the product of the values of the pixels corresponding to a local pattern for the whole image. Since patterns with N≤1 (M1 to M5) have smaller scales than patterns with N=2 (M6 to M25), however, the values of the characteristic amounts need to be normalized (to match the scales). According to the embodiment, therefore, the value of the characteristic amount is multiplied by the square of the value of the pixel of the reference point for a pattern with N=0 (M1), and the value of the characteristic amount is multiplied by the value of the pixel of the reference point for patterns with N=1 (M2 to M5).

Next, the image characteristic amount extracting section 16 acquires the characteristic amounts of 25 patterns as shown in FIG. 10B from the higher-order local autocorrelation function with every pixel in each segment screen taken as a reference point. Accordingly, one segment screen is expressed by the 25 dimensions, and the characteristic amount of the segment screen is obtained (reduction of dimensions). Therefore, a single extracted hand image is expressed by 64 segment screens×25 patterns of total 1600 dimensions for the entire extracted hand image.

Although the dimensions of the image characteristic amounts are reduced using the higher-order local autocorrelation function according to the embodiment, the invention is not limited to this case, and any scheme which can reduce the dimensions of the image characteristic amounts is available. In addition, although the image characteristic amount is extracted hand image for a segment image according to the embodiment, the invention is not limited to this case, and the extracted hand image may not be divided so that the image characteristic amount of the entire extracted hand image is acquired.

Then, a data set having a set of the image shape ratios (tallness, top-heaviness and right-biasness), the image characteristic amount, the finger joint angle data and the forearm rotation (wrist rotation) angle data, which are acquired by the procedures described referring to FIGS. 3 and 5, is stored in the database 18. A specific example of the structure of the data set stored in the database 18 is shown in FIG. 11.

According to the embodiment, as shown in FIG. 11, the image characteristic amounts (No. 1 to 1600), the image shape ratios (tallness, top-heaviness and right-biasness), angle data of individual finger joints (thumb to little finger), and forearm rotational angle data are stored in the named order from the column of image number (data set number) (left side in FIG. 11).

[Estimation Process for Human Hand Posture]

Figure 12:
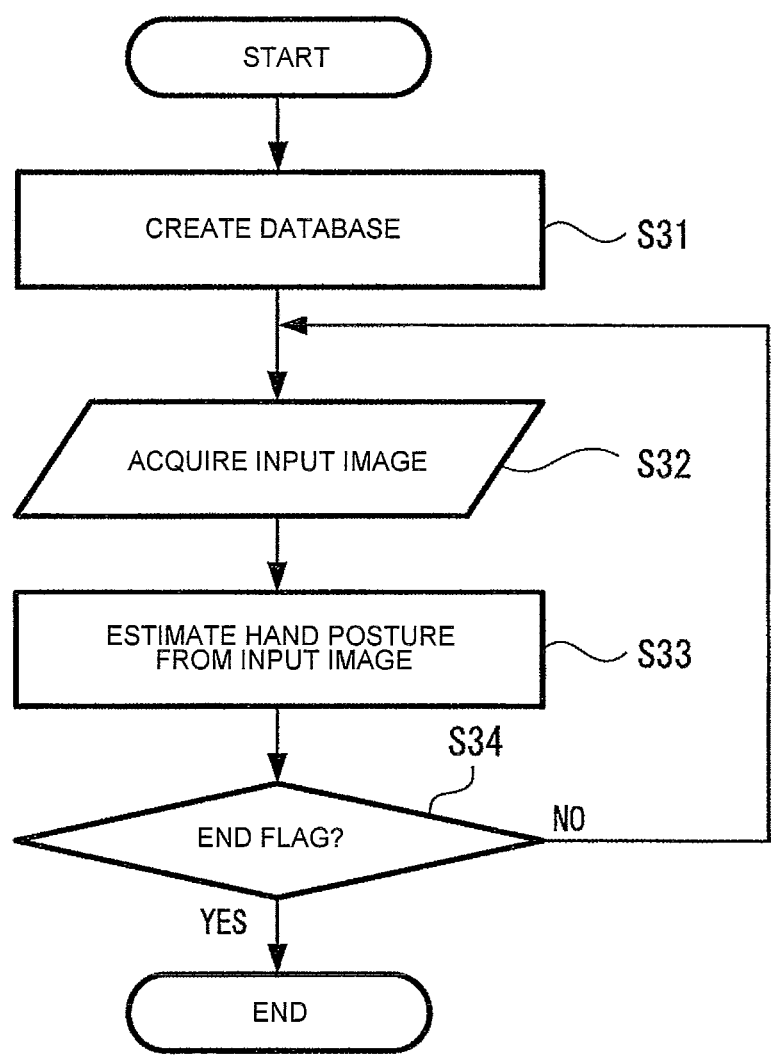
FIG. 12 is a flowchart illustrating procedures for the general operation of the system.
Figure 13:
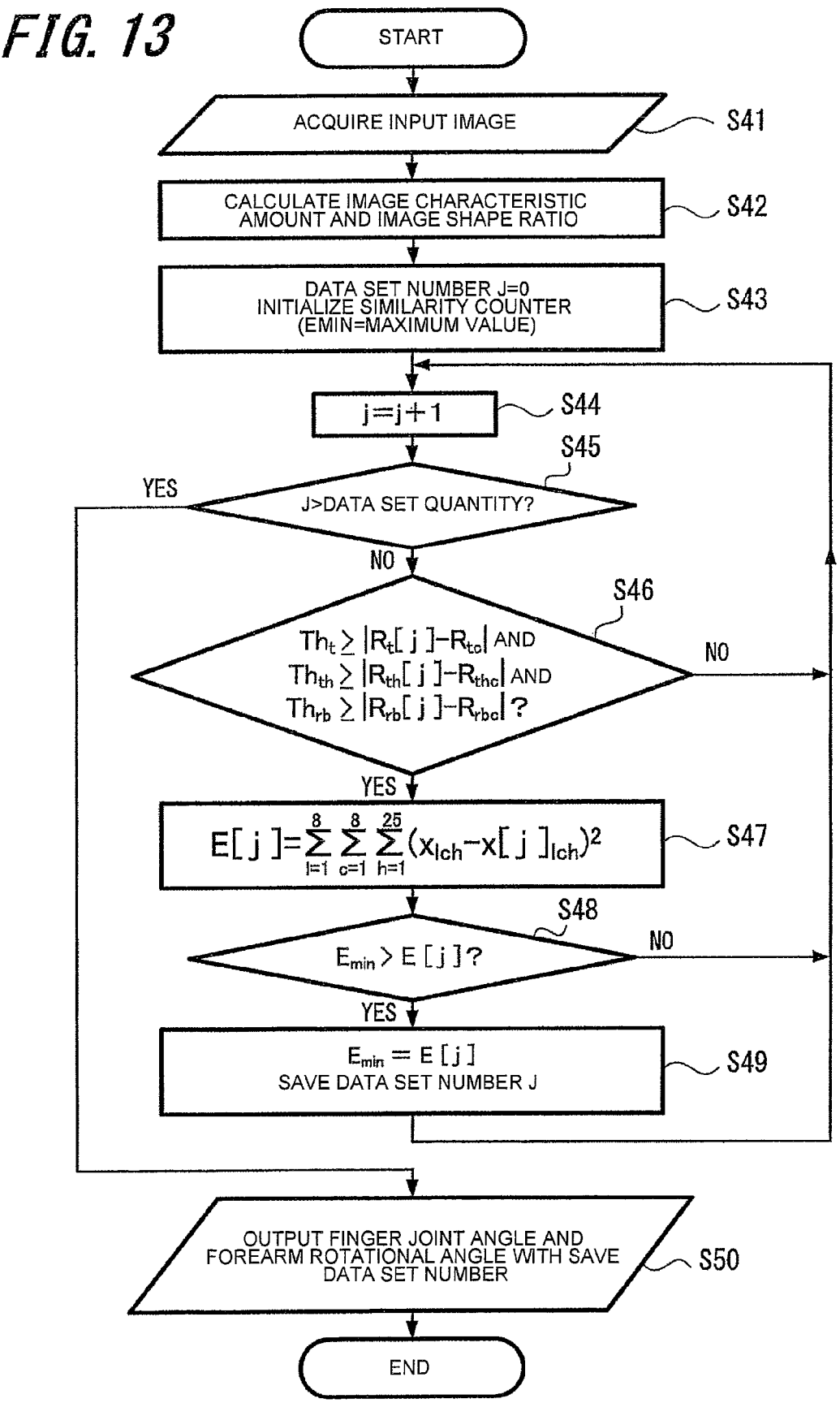
FIG. 13 is a flowchart illustrating procedures for a human hand posture estimation process.

Next, the estimation process for a human hand posture in the human hand posture estimating device 20 according to the embodiment will be described referring to FIGS. 12 and 13. The reference numerals of the individual devices and means in the following description are the same as those given to the individual sections in FIG. 1. FIG. 12 is a diagram illustrating the general flow of the estimation process for a human hand posture according to the embodiment. FIG. 13 is a flowchart illustrating the process contents of step S33 in FIG. 12.

First, the database 18 is created (step S31). In this step S31, the database is created through the above-described procedures of creating the database. Next, the image data storage means 21 acquires and stores a captured image (input image) picked up with the camera 33 (step S32).

In step S32, the image data storage means 21, like the image data storage means 15 in the database creating device 10 (see steps S11 to S17 in FIG. 5), extracts the extracted hand image (first hand image) and the base point of the hand image, which are needed at the time of acquiring the image shape ratio and image characteristic amount of the input image, from the input image.

Specifically, the base point of the hand image is extracted from the input image using the labeling technique described referring to FIGS. 6A and 6B, and an extracted hand image in a predetermined range (e.g., range encircled by the white frame in FIGS. 7A to 7C) is extracted from the input image based on the base point.

Then, the human hand posture estimating device 20 estimates the human hand posture of the input image using the extracted hand image and the base point thereof, output from the image data storage means 21 (step S33). The process of this step S33 will be described in detail referring to FIG. 13.

After estimating the human hand posture of the input image, the human hand posture estimating device 20 determines whether or not an end flag is input (step S34). When the end flag is input (Yes in step S34), the estimation process is terminated. When the estimation process is to be continued (No in step S34), on the other hand, the flow returns to step S32 to repeat the processes of steps S32 to S34.

Next, the estimation process of step S33 will be described below referring to FIG. 13. First, the image shape ratio calculating section 22 and the image characteristic amount extracting section 23 acquire the extracted hand image and the base point thereof, output from the image data storage means 21 (step S41).

Then, using the acquired extracted hand image and base point thereof, the image shape ratio calculating section 22 and the image characteristic amount extracting section 23 respectively calculate the image shape ratios (tallness, top-heaviness and right-biasness) and the image characteristic amount (higher-order local auto correlation function) of the extracted hand image (step S42). In this step S42, a process similar to the above-described process of calculating the image shape ratio and image characteristic amount at the time of creating the database 18 (see steps S18 to S22 in FIG. 5) is carried out to calculate the image shape ratio and image characteristic amount of the extracted hand image.

Specifically, the image shape ratios (tallness, top-heaviness and right-biasness) are acquired by obtaining the shape parameters H, $H_u$, W and $W_r$ of the extracted hand image as shown in FIG. 9, and the tallness $R_t$, the top-heaviness $R_{th}$ and the right-biasness $R_{rb}$ are calculated using those values. For the image characteristic amount, first, the extracted hand image is reduced (normalized) to an image with 64×64 pixels. Then, the reduced (normalized) image is divided by eight vertically and eight horizontally (into a total of 64 segments), and the image characteristic amount of each segment image is calculated.

Then, the data set number j which is one of operation control counters of the collation means 24 and the estimation means 25 of the human hand posture estimating device 20 is reset to initialize the similarity counter (step S43). Then, the data set number j is updated (j=j+1) (step S44). Then, the collation means 24 determines whether or not the data set number j is greater than the data set quantity (step S45).

When the data set number j is equal to or less than the total data set quantity, i.e., when collation of the input image with every data set has not completed (No in step S45), the collation means 24 acquires the image shape ratios (tallness $R_{tc}$, top-heaviness $R_{thc}$ and right-biasness $R_{rbc}$) of the extracted hand image, calculated by the image shape ratio calculating section 22. In addition, the collation means 24 reads the image shape ratios (tallness $R_t[j]$, top-heaviness $R_{th}[j]$ and right-biasness $R_{rb}[j]$) in the data set with the data set number j.

Then, the collation means 24 determines whether or not the absolute value of the difference between the image shape ratio of the extracted hand image calculated by the image shape ratio calculating section 22 and the image shape ratio of the data set number j is equal to or less than a predetermined threshold value (step S46: first estimation process). When the shape of the hand image of the input image is similar to the shape of the hand image with the data set number j, the absolute value of the difference between the image shape ratio of the extracted hand image and the image shape ratio of the data set number j becomes smaller, which is equal to or less than the threshold value.

Specifically, in step S46, it is determined whether or not each image shape ratio satisfies the following three conditions.

(1) Threshold value on the tallness $Th_t \geq |R_t[j] - R_{tc}|$ (2) Threshold value on the top-heaviness $Th_{th} \geq |R_{th}[j] - R_{thc}|$ (3) Threshold value on the right-biasness $Th_{rb} \geq |R_{rb}[j] - R_{rbc}|$ How to determine the threshold values will be elaborated later. Although the absolute value of the difference between the image shape ratio of the extracted hand image and the image shape ratio of the data set number j is used as a decision parameter in the embodiment, the invention is not limited to this case. An arbitrary parameter which relates to the difference between the image shape ratio of the extracted hand image and the image shape ratio of the data set number j can be used. For example, the square of the difference between the image shape ratio of the extracted hand image and the image shape ratio of the data set number j may be used as a parameter.

When the result of the decision in step S46 is No, the entire shape of the input hand image is not similar to the entire shape of the hand image with the data set number j, so that the flow returns to step S44 to update the data set number j and steps S45 and S46 (first estimation process) are repeated (with another data set number).

When the result of the decision in step S46 is Yes, the entire shape of the input hand image is similar to the entire shape of the hand image with the data set number j, so that the data set number j is output to the estimation means 25.

Then, the estimation means 25 reads the image characteristic amount in the data set which corresponds to the input data set number j. In addition, the estimation means 25 acquires the image characteristic amount of the hand image extracted by the image characteristic amount extracting section 23. Then, the estimation means 25 collates the image characteristic amount with the data set number j with the image characteristic amount extracted by the image characteristic amount extracting section 23 to execute an estimation process for the human hand posture of the input image (second estimation process) (step S47).

According to the embodiment, as the scheme for the estimation process in step S47 (search for similar images), the Euclidean distance between the image characteristic amount $x[j]_{1ch}$ with the data set number j and the image characteristic amount $x_{c1ch}$ of the input image is acquired to execute similarity search. The Euclidean distance E[j] between the image characteristic amount $x[j]_{1ch}$ with the data set number j and the image characteristic amount $x_{c1ch}$ of the input image is calculated from the following equation. The subscripts 1, c, and h given to the image characteristic amount x respectively represent the row number (1-8) and the column number (1-8) of segment images, and the higher-order local autocorrelation pattern number (1-25) (see FIGS. 10A and 10B).

$$E[j] = \sum_{l=1}^{8} \sum_{c=1}^{8} \sum_{h=1}^{25} (x_{lch} - x[j]_{lch})^2 \quad \text{[Eq. 2]}$$

Next, the estimation means 25 compares the Euclidean distance E[j] calculated from the above equation with the Euclidean distance $E_{min}$ which is the minimum one of previously calculated Euclidean distances E (step S48).

When the Euclidean distance E[j] is smaller than $E_{min}$ (Yes in step S48), $E_{min}$ is updated, the data set number j is saved in the storage section (not shown) of the drive instruction means 26, and the flow returns to step S44. When the Euclidean distance E[j] is equal to or larger than $E_{min}$ (No in step S48), on the other hand, the flow returns to step S44 without updating $E_{min}$ and saving the data set number j in the storage section (not shown) of the drive instruction means 26.

When the steps S44 to S49 are repeated by the quantity of data sets, i.e., when collation of the input image with every data set is completed, the data set number j becomes larger than the data set quantity, and the decision in step S45 results in Yes. In this case, the finger joint angle and the forearm rotational angle for the data set number j saved in the storage section (not shown) of the drive instruction means 26 are output (step S50).

According to the embodiment, the human hand posture of the input image is estimated and the finger joint angle and the forearm rotational angle of the most similar human hand posture are output as described above. Since similar images are searched based on the characteristic of the entire shape of the hand image in the first estimation process according to the human hand posture estimating method of the embodiment, the number of pieces of collation image data to be similar image candidates can be reduced to a certain quantity in the first estimation process. As a result, the amount of processing in the second estimation process can be the minimum necessary amount. According to the embodiment, therefore, the most similar image can be retrieved fast even when a large-scale database is used.

Unlike the related art, the human hand posture estimating method of the embodiment finds the most similar image without using the results of searching for hand images at the previous time. Therefore, it is possible to retrieve the most similar image more surely with high estimation accuracy, regardless of the speed or size of a change in the human hand posture between sequential hand images.

According to the human hand posture estimating method of the embodiment, the base point of the hand image is extracted from the captured image (original image) using the labeling technique described referring to FIGS. 6A and 6B, and an extracted hand image for acquiring parameters (image shape ratio and image characteristic amount) needed for shape estimation is cut out (extracted) from the captured image. This scheme has the following advantages.

Information that is saved in the database according to the embodiment is "image information only on a hand". On the contrary, an image acquired by capturing with a camera is at least "the image of a hand including an arm (forearm portion) ". Therefore, to obtain high estimation accuracy in the scheme of executing similarity estimation based on the low-order image characteristic amount, such as higher-order local autocorrelation function, as in the human hand posture estimating method of the embodiment, an "image only in a hand region" should be extracted from the image captured with the a camera.

Besides the method of the invention, the following method may be used as a method of extracting an "image only in a hand region". First, the "constricted portion" of the contours of a hand and an arm shown in the hand image (original image) including the forearm portion is detected, and is regarded as a wrist. Then, an image closer to the distal end than the "constricted portion" is cut out from the captured image as the "image only in a hand region".

Figure 8A:
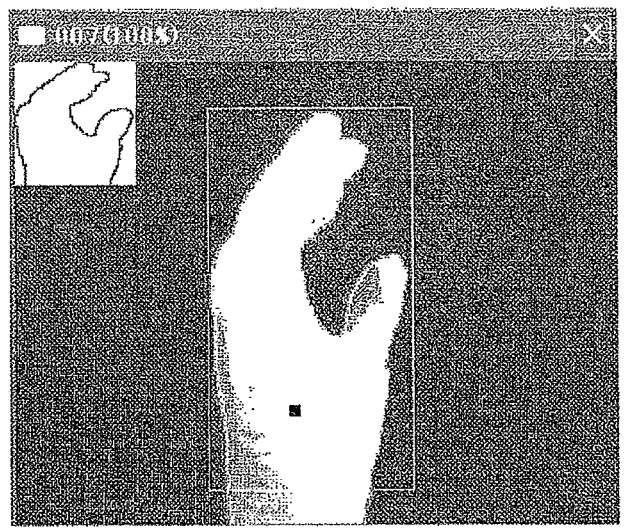
FIGS. 8A to 8C are diagrams showing cutout examples of an extracted hand image.
Figure 8B:
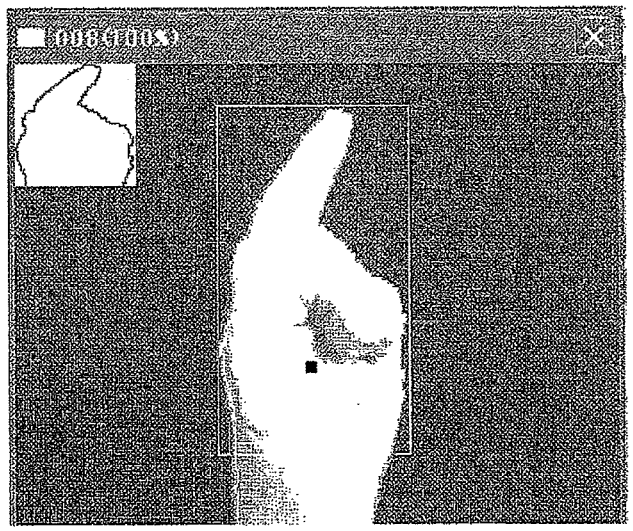
Figure 8C:
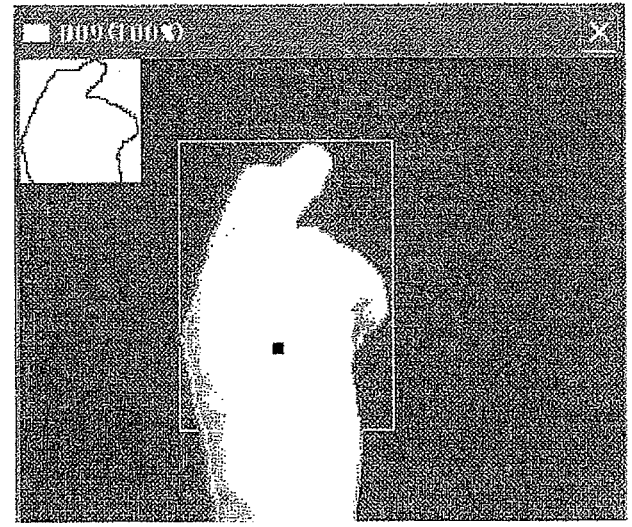

According to this method, however, while the "constricted portion" of the contour is likely to correspond to a wrist when the palm of the hand or the back thereof is facing the camera (e.g., in the case of FIG. 7A), the position of the "constricted portion" on the palm side may differ from the position of the "constricted portion" on the back side of the hand, for example, in the direction of extension of the forearm when the side portion of the thumb or the little finger of the hand is facing the camera (e.g., in the case of FIG. 8A). In addition, depending on the angle of the thumb, a portion around the base of the thumb may be determined as the "constricted portion", so that the "constricted portion" may not correspond to the wrist. In other words, this method has a difficulty in detecting the position of a wrist accurately, and provides unstable shape estimation.

According to the embodiment, on the other hand, an "image only in a hand region" (extracted hand image) is cut out from the captured image (original image) based on the base point of the hand image extracted using the labeling technique as described above. Therefore, the extracted hand image can be cut out from the captured image regardless of the problem inherent to the aforementioned method of detecting the "constricted portion", and stable shape estimation is possible. Further, the labeling technique is a process with a very light processing load.

In the method of extracting an "image only in a hand region" (extracted hand image) according to the embodiment, when data with a shape identical or similar to the human hand posture in the captured image is present in the database, a hand image with the same shape as the extracted hand image which has been generated at the time of creating the database can be extracted from the captured image. Accordingly, an adequate data set can be selected at the time of carrying out the accurate similarity collation using low-order image characteristic amounts, thus ensuring high-accuracy estimation.

That is, the embodiment can provide a simple human hand posture estimating method which is excellent in stability and accuracy.

Further, according to the human hand posture estimating method of the embodiment, the extracted hand image is normalized to an image with a predetermined size (64×64 pixels in the above example) at the time of calculating the image characteristic amount. Even when the distance between the camera and a hand to be captured varies, changing the size of the extracted hand image, therefore, the image characteristic amount is calculated from an image of the same size (normalized image). Therefore, stable shape estimation is possible regardless of whether the position of a hand to be captured is close to the camera or is far therefrom within the range where the hand is shown in the captured image in a predictable size (e.g., 64×64 pixels or larger).

[Method of Determining Threshold Values, Tallness, Top-Heaviness and Right-Biasness]

Next, a description will be given of one example of the method of determining the threshold value $Th_t$ on the tallness, the threshold value $Th_{th}$ on the top-heaviness, and the threshold value $Th_{rb}$ on the right-biasness which are used in step S45 in FIG. 13.

When any one of the threshold value $Th_t$ on the tallness, the threshold value $Th_{th}$ on the top-heaviness, and the threshold value $Th_{rb}$ on the right-biasness increases, the estimation error of estimating a human hand posture decreases and converges to a certain value. When those three threshold values are made smaller, on the contrary, the number of hand images (data sets) which pass the first estimation process decreases, reducing the number of hand images which are subjected to similarity calculation in the second estimation process (process of collating image characteristic amounts). That is, reducing the three threshold values can increase the processing speed. In view of the above, it is necessary to consider the balance between the estimation accuracy and the processing speed at the time of determining the three threshold values.

As one method of determining the three threshold values, each of the three threshold values may be changed to various values, the hand image estimation process may be carried out for each combination of obtained three threshold values, and the combination of the threshold values which provides the best balance between the estimation error and the processing speed may be obtained.

For example, when each threshold value is changed to seven values of 0.001, 0.011, 0.021, 0.031, 0.041, 0.051 and 0.061, 343 combinations of the three threshold values in total can be provided. Then, the average value and standard deviation of estimation errors in each combination, and the quantity of data sets which are selected (matched) in the first estimation process may be plotted on a graph to determine the values for the threshold values which adequately satisfy both the estimation error and the processing speed.

According to the method, actually, combinations of smaller threshold values and combinations of larger threshold values are often negligible, so that there is not so many combinations of threshold values which should be considered.

However, even if changes in the average value and standard deviation of estimation errors and the quantity of selected data sets (three dependent variables) are plotted on a graph for the combinations of the three threshold values (three independent variables), it is not easy to intuitively (promptly) acquire the threshold values which adequately satisfy both the estimation accuracy and the processing speed.

Figure 14:
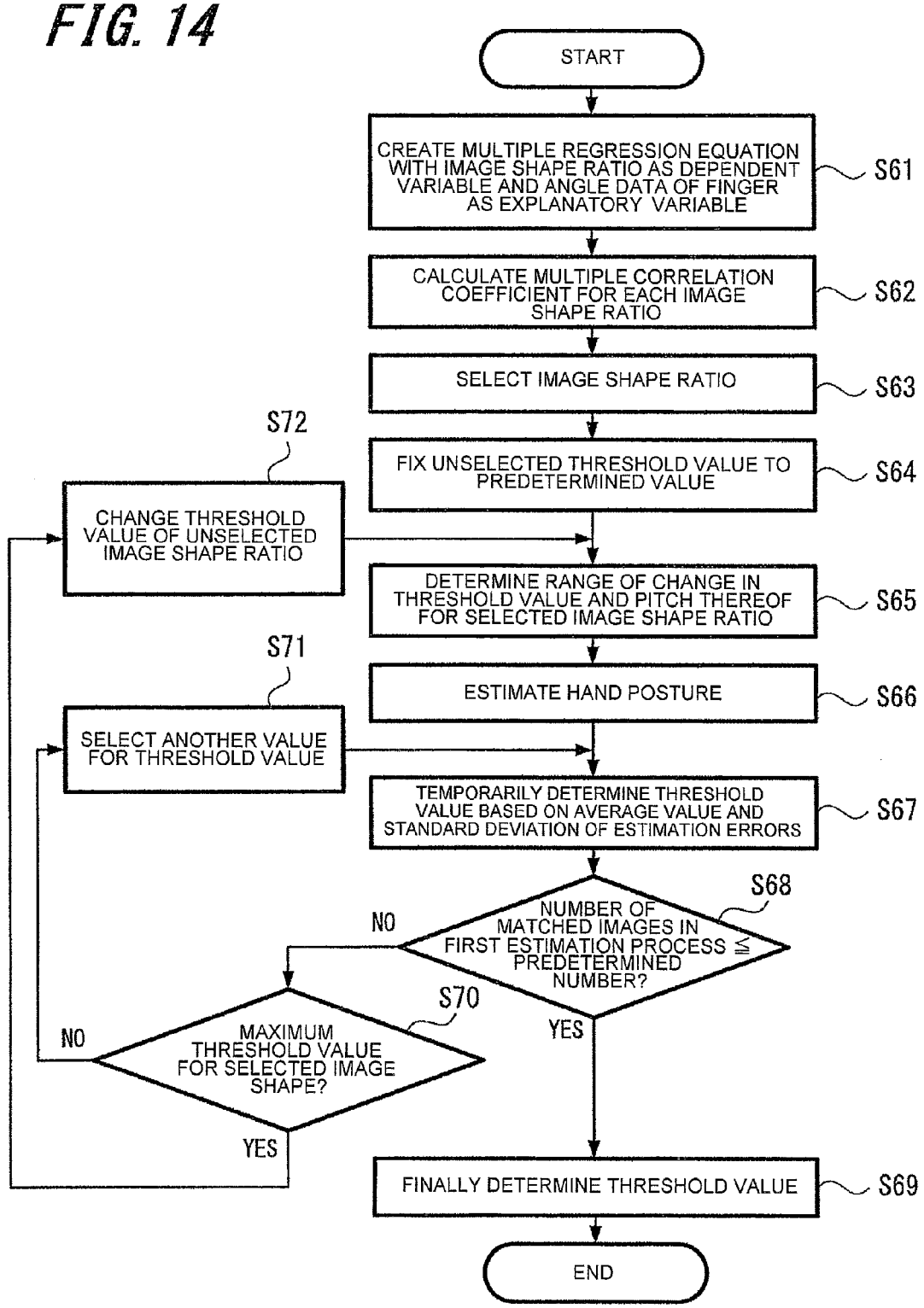
FIG. 14 is a flowchart illustrating procedures of determining a threshold value on the image shape ratio.
Figure 18:
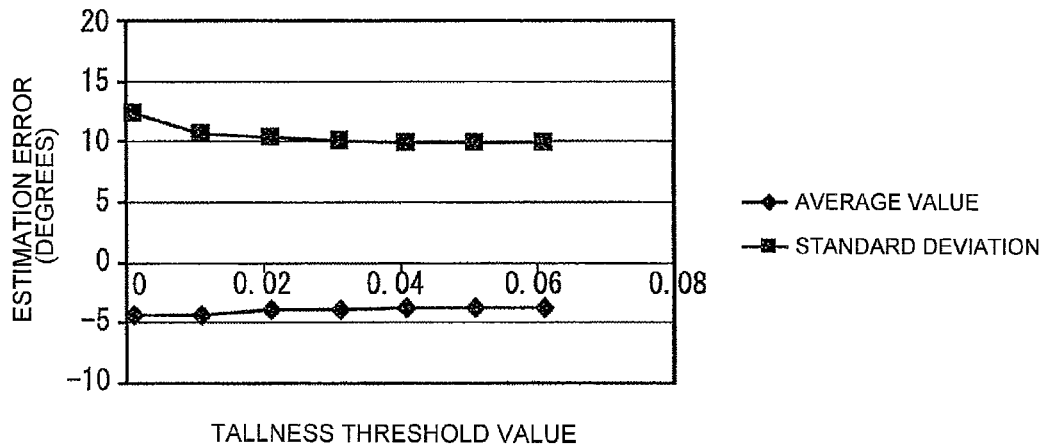
FIG. 18 is a diagram showing the relation among the three threshold values on tallness, top-heaviness and right-biasness, and the average value and standard deviation of estimation errors.
Figure 19:
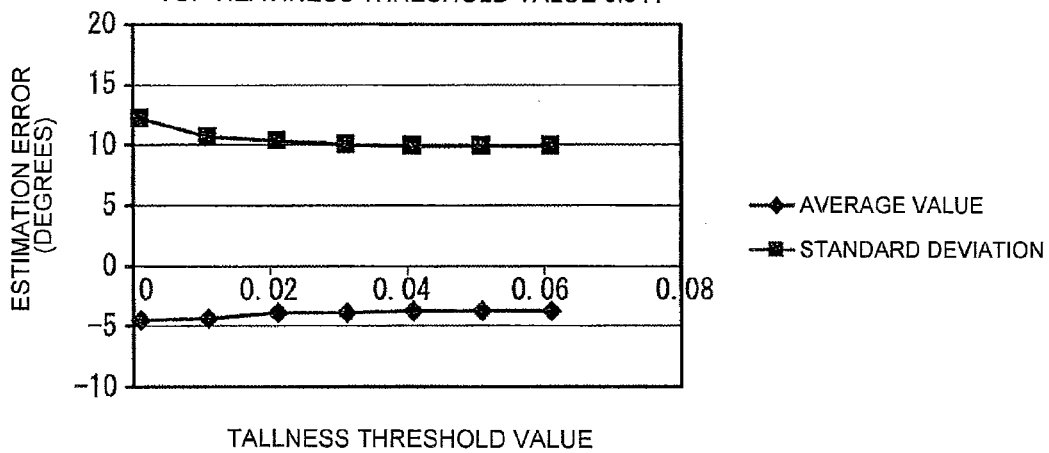
FIG. 19 is a diagram showing the relation among the three threshold values on tallness, top-heaviness and right-biasness, and the average value and standard deviation of estimation errors.
Figure 20:
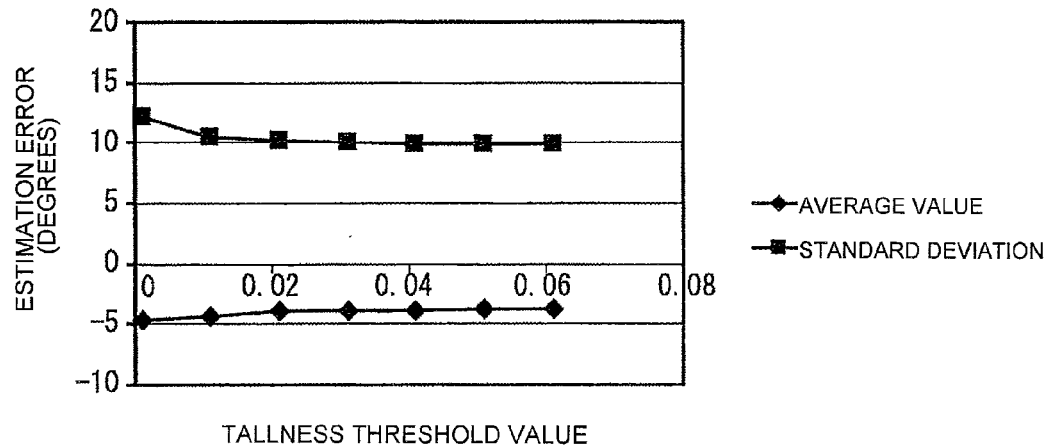
FIG. 20 is a diagram showing the relation among the three threshold values on tallness, top-heaviness and right-biasness, and the average value and standard deviation of estimation errors.
Figure 21:
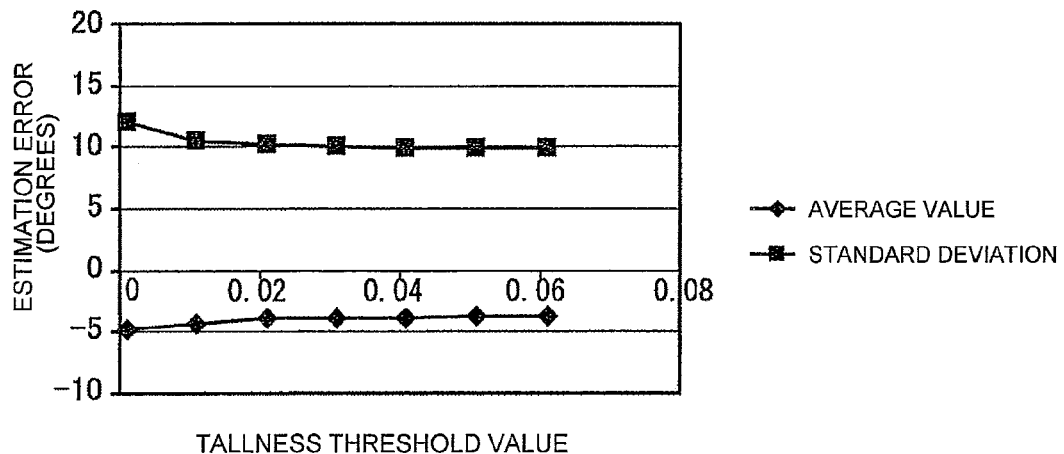
FIG. 21 is a diagram showing the relation among the three threshold values on tallness, top-heaviness and right-biasness, and the average value and standard deviation of estimation errors.
Figure 22:
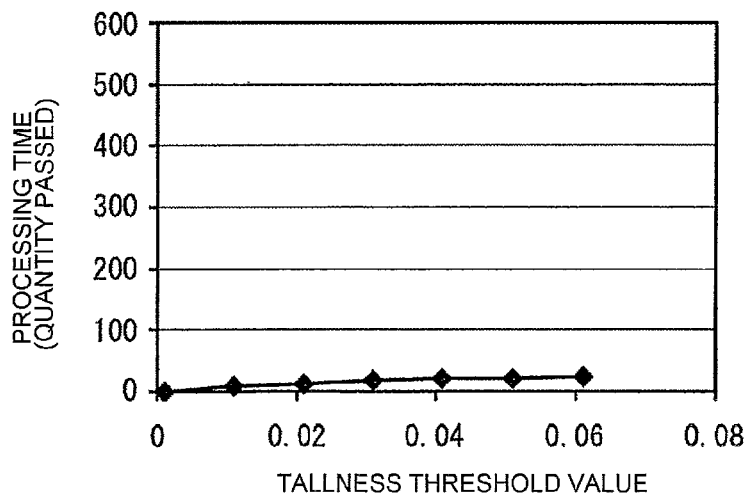
FIG. 22 is a diagram showing the relation among the three threshold values on tallness, top-heaviness and right-biasness, and the quantity of data sets which pass a first estimation process.
Figure 23:
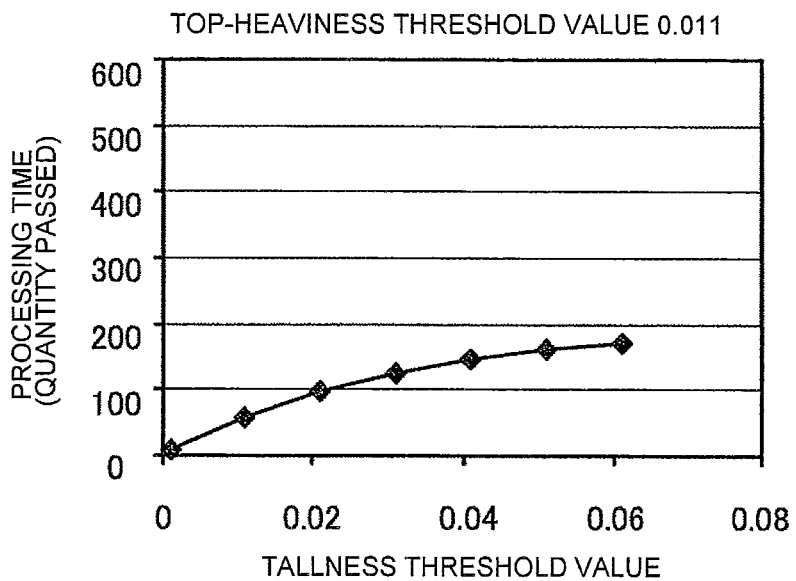
FIG. 23 is a diagram showing the relation among the three threshold values on tallness, top-heaviness and right-biasness, and the quantity of data sets which pass the first estimation process.
Figure 24:
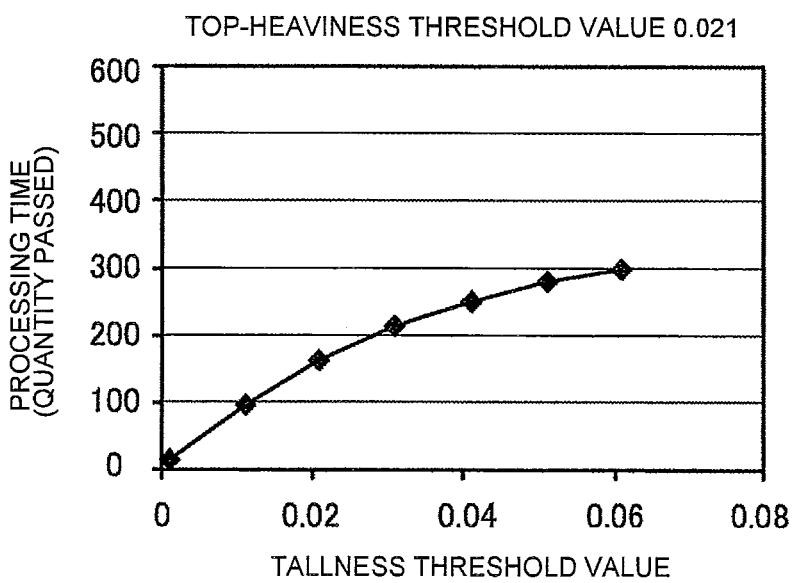
FIG. 24 is a diagram showing the relation among the three threshold values on tallness, top-heaviness and right-biasness, and the quantity of data sets which pass the first estimation process.
Figure 25:
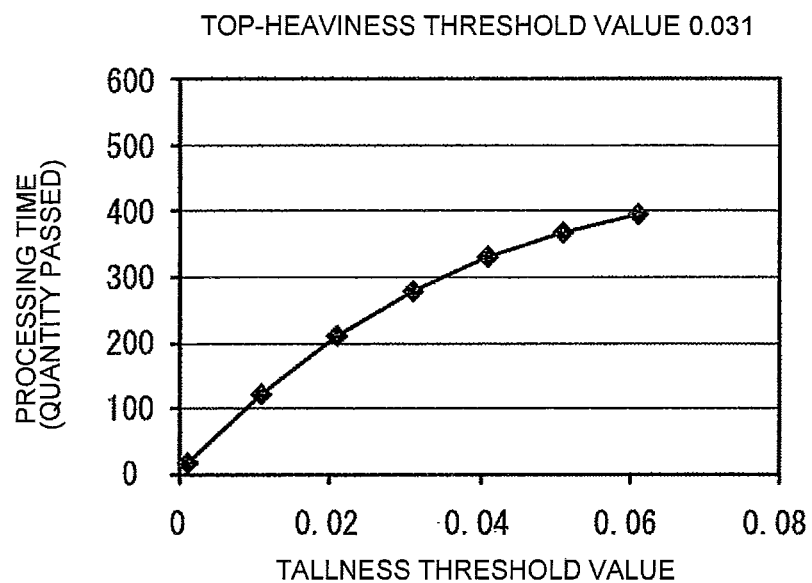
FIG. 25 is a diagram showing the relation among the three threshold values on tallness, top-heaviness and right-biasness, and the quantity of data sets which pass the first estimation process.
Figure 26:
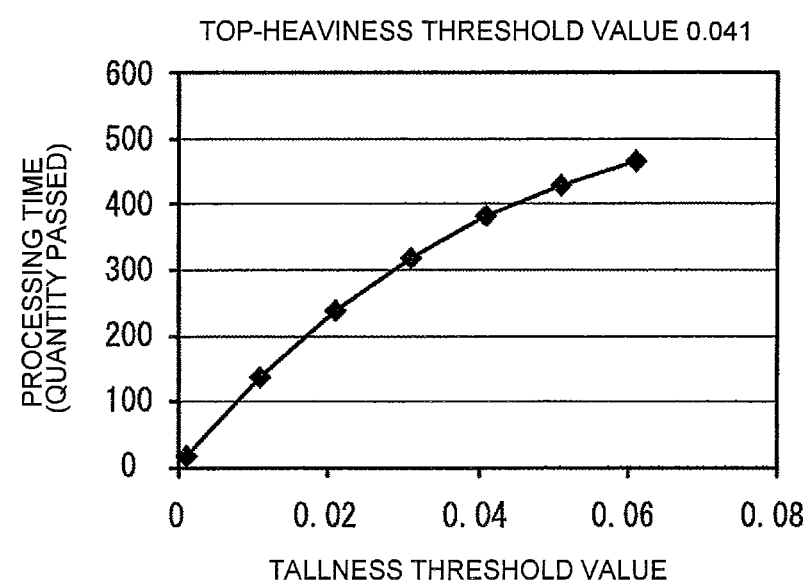
FIG. 26 is a diagram showing the relation among the three threshold values on tallness, top-heaviness and right-biasness, and the quantity of data sets which pass the first estimation process.
Figure 27:
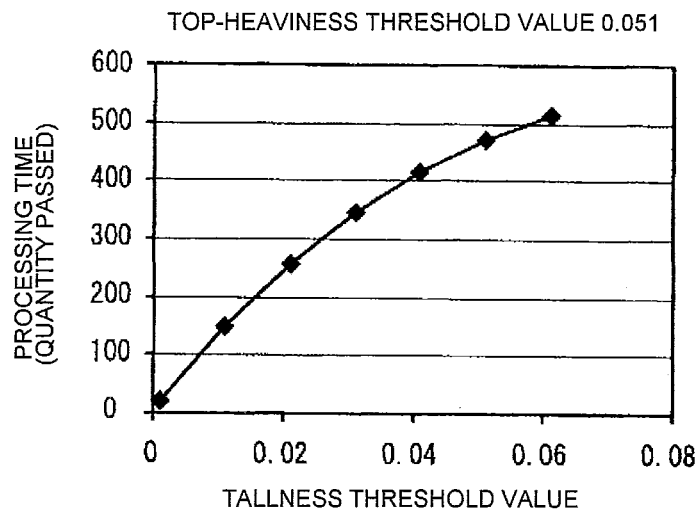
FIG. 27 is a diagram showing the relation among the three threshold values on tallness, top-heaviness and right-biasness, and the quantity of data sets which pass the first estimation process.
Figure 28:
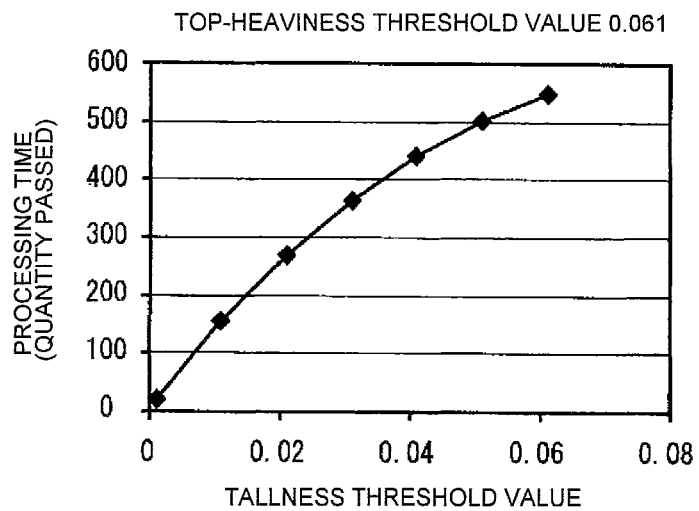
FIG. 28 is a diagram showing the relation among the three threshold values on tallness, top-heaviness and right-biasness, and the quantity of data sets which pass the first estimation process.
Figure 29:
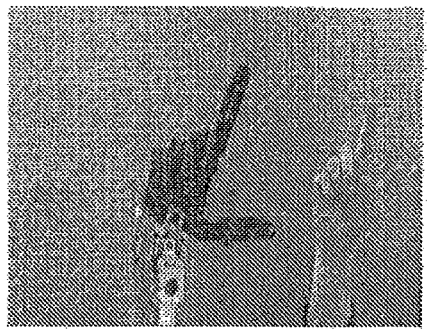
FIG. 29 is a diagram illustrating an estimation operation which is performed by a human hand posture estimating device according to a first modification.
Figure 30:
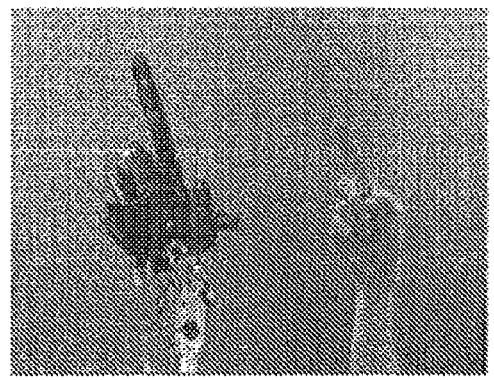
FIG. 30 is a diagram illustrating the estimation operation which is performed by the human hand posture estimating device according to the first modification.
Figure 31:
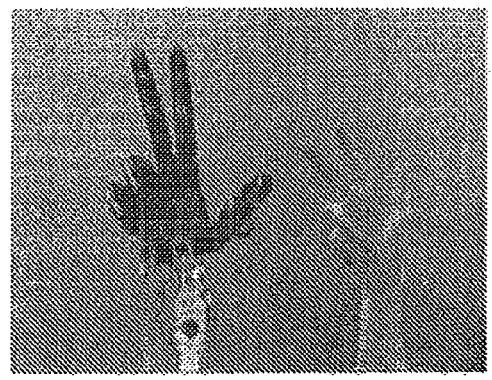
FIG. 31 is a diagram illustrating the estimation operation which is performed by the human hand posture estimating device according to the first modification.
Figure 32:
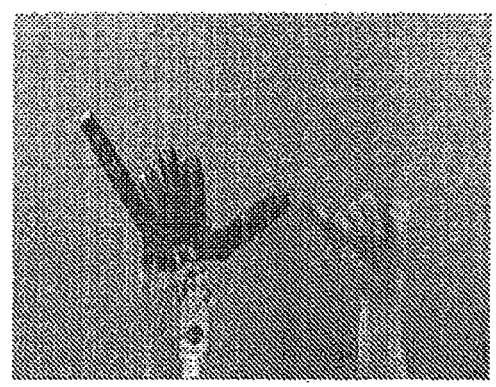
FIG. 32 is a diagram illustrating the estimation operation which is performed by the human hand posture estimating device according to the first modification.
Figure 33:
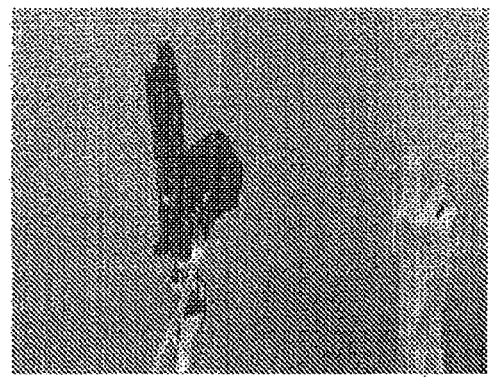
FIG. 33 is a diagram illustrating the estimation operation which is performed by the human hand posture estimating device according to the first modification.
Figure 34:
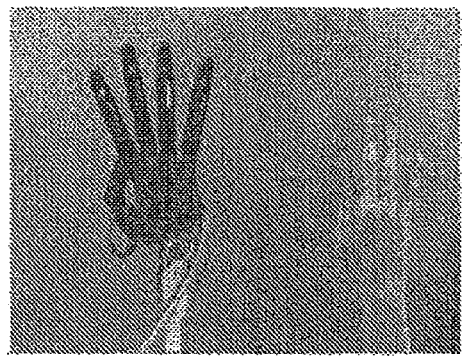
FIG. 34 is a diagram illustrating the estimation operation which is performed by the human hand posture estimating device according to the first modification.

In this respect, the embodiment employs a method of setting the three threshold values $Th_t$, $Th_{th}$ and $Th_{rb}$ more easily than the above scheme. This method will be described referring to FIG. 14. The reference numerals of the individual means in the following description are the same as those given to the individual sections in FIG. 2. FIG. 14 is a flowchart illustrating procedures of determining the three threshold values according to the embodiment.

First, the multiple regression equation calculating section 41 of the threshold value determining means 19 creates a multiple regression equation having an image shape ratio as a dependent variable and joint angle data as an explanatory variable for each of the three image shape ratios (tallness $R_t$, top-heaviness $R_{th}$ and right-biasness $R_{rb}$) for all the data sets in the database (step S61). The finger joint angle data (17 kinds) which are actually measured by the data glove 30 and the forearm rotational angle data (one kind) which is actually measured by the forearm rotational angle measuring means 31 are used as joint angle data used in the multiple regression equation. The number of explanatory variables predictor variables in the multiple regression equation therefore becomes 18.

Next, the correlation coefficient calculating section 42 of the threshold value determining means 19 calculates the multiple correlation coefficient (correlation coefficient between the value predicted through the multiple regression equation and the actual value) for each image shape ratio (step S62). The image shape ratio that has a larger correlation coefficient indicates a stronger correlation with the human hand posture (finger joint angle data). That is, the image shape ratio which greatly influences the estimation of a human hand posture is determined in this step S62.

Next, the image shape ratio selecting section 43 of the threshold value determining means 19 selects an image shape ratio corresponding to the threshold values which are varied in the human hand posture estimation process to be described later based on the multiple correlation coefficient calculated in the above step (step S3). Specifically, the image shape ratio which has the largest multiple correlation coefficient, or the image shape ratios which have the largest multiple correlation coefficient and the second largest multiple correlation coefficient are selected.

As another way of selecting the image shape ratio, the image shape ratio which has the largest partial regression coefficient applied to the forearm rotational angle or the image shape ratios which have the largest partial regression coefficient and the second largest partial regression coefficient applied to the forearm rotational angle may be selected. Since the forearm rotation is the factor that greatly changes how a hand appears in the image, the correlation between the forearm rotational angle and the image shape ratio in the human hand posture estimation is high. In step S64, therefore, the image shape ratio may be selected based on the partial regression coefficient applied to the forearm rotational angle.

The partial regression coefficient which is applied to each forearm rotational angle data in the multiple regression equation can be obtained by solving the multiple regression equation of image shape ratios created for each data set as simultaneous equations. It is to be noted that the number of pieces of joint angle data is not normally equal to the quantity of data sets (the number of multiple regression equations), so that such simultaneous equations should be solved with the equations set to overdetermined equations and using the singular value decomposition or the like.

According to the embodiment, the multiple correlation coefficient of the right-biasness $R_{rb}$ and the partial regression coefficient of the forearm rotation are smaller than those of the other two image shape ratios, so that the tallness $R_t$ and the top-heaviness $R_{th}$ are selected in step S63.

Next, the threshold value on the unselected image shape ratio is fixed to a predetermined value (step S64). Specifically, the according to the invention, the threshold value on the right-biasness $R_{rb}$ is set to 0.011. It is to be noted that the threshold value on the image shape ratio which is not selected in step S63 may not be used in the first estimation process, and if the threshold value is used, it is preferable to set and fix the value to a not extremely small value.

Next, the image shape ratio selecting section 43 of the threshold value determining means 19 sets the variation width and the pitch of the threshold value (one or two) on the image shape ratio selected in step S63 (step S65). According to the embodiment, the threshold values $Th_t$ and $Th_{th}$ on the tallness $R_t$ and the top-heaviness $R_{th}$ are set to 0.001 to 0.061, and the pitch is set to 0.01 in step S65.

Next, the human hand posture estimating section 44 of the threshold value determining means 19 performs the human hand posture estimation for each combination of the three threshold values determined in step S65 to actually acquire the average value and standard deviation of estimation errors and the quantity of data sets which are matched in the human hand posture estimation (step S66). The human hand posture estimation process carried out in this step S66 is similar to the estimation process which is carried out by the human hand posture estimating device 20 (see FIG. 13).

In the step S66, it is necessary to compare the true values of the human hand posture (i.e., actually measured value) with the estimated values. In the step S66, therefore, a thin white glove is put on the data glove 30 to acquire the true values of the human hand posture. As another approach, half data sets in the database may be selected to be used as estimated values, and the remaining half data sets may be used as true values (data for the input image) to acquire the average value and standard deviation of estimation errors and the quantity of data sets matched in the first estimation process.

According to the embodiment, the results obtained in step S66 are shown in FIGS. 15 to 28. FIGS. 15 to 21 are diagrams showing changes in the average value and standard deviation of estimation errors for the combinations of the threshold values $Th_t$ and $Th_{th}$ on the tallness $R_t$ and the top-heaviness $R_{th}$. In the individual diagrams, the average value and standard deviation of estimation errors are taken on the ordinate axis, and the threshold value $Th_t$ on the tallness $R_t$ is taken on the abscissa axis.

FIGS. 22 to 28 are diagrams showing the quantities of data sets which are matched with the combinations of the threshold values $Th_t$ and $Th_{th}$ on the tallness $R_t$ and the top-heaviness $R_{th}$. In the individual diagrams, the quantity of data sets selected in the first estimation process is taken on the ordinate axis, and the threshold value $Th_t$ on the tallness $R_t$ is taken on the abscissa axis.

Next, based on the average value and standard deviation of estimation errors acquired in step S66, the threshold value determining section 45 of the threshold value determining means 19 selects threshold values that provide the average value and standard deviation of estimation errors which are both substantially converged to given values and are as small values as possible (step S67: temporary determination).

When a plurality of image shape ratios are selected in step S63, a combination of the threshold values is selected. It is understood from the measuring results in FIGS. 15 to 21 that the favorable threshold value $Th_t$ of the tallness $R_t$, and the favorable threshold value $Th_{th}$ of the top-heaviness $R_{th}$ are both 0.011 according to the embodiment.

Next, the threshold value determining section 45 of the threshold value determining means 19 determines whether or not the quantity of data sets selected in the first estimation process is equal to or less than a predetermined quantity at the threshold value of the image shape ratio temporarily determined in step S67 (step S68). The decision value (the aforementioned predetermined quantity) used in the decision in this step is adequately set according to the processing performance or the like of the device.

When the selected quantity of data sets is equal to or less than the predetermined quantity (Yes in step S68), the threshold value determining section 45 outputs the threshold value temporarily determined in step S67 as a finally determined threshold value (step S69: final determination).

When the selected quantity of data sets is greater than the predetermined quantity (No in step S68), on the other hand, it is determined whether or not the threshold value (one or two) on the image shape ratio selected in step S63 is the maximum (step S70).

When the decision in step S70 results in No, a threshold value slightly larger than the temporarily determined threshold value is selected (step S71), and the flow returns to step S67 to repeat the subsequent processes.

When the decision in step S70 results in Yes, on the other hand, the value of the threshold value of the image shape ratio which is not selected in step S63 is changed (step S72). Specifically, the value of the threshold value of the image shape ratio which has provided the smallest multiple correlation coefficient and partial regression coefficient of forearm rotation are set slightly larger. Then, the flow returns to step S65 to repeat the subsequent processes.

According to the embodiment, the threshold value $Th_t$ on the tallness, the threshold value $Th_{th}$ on the top-heaviness, and the threshold value $Th_{rb}$ on the right-biasness are determined as described above. Specifically, the processes of the steps S61 to S72 are performed, resulting in the combination of the optimal three threshold values of $(Th_t, Th_{th}, Th_{rb})=(0.011, 0.011, 0.011)$.

It is to be noted that the first estimation process using the image shape ratios is intended to reduce the quantity of data sets to be similar candidates in the first estimation process, and to reduce the amount of search (amount of processing) at the time of executing detailed similarity collation in the second estimation process. Therefore, the threshold values should be set in such a way that similar images selected as most similar images when full search is conducted are not overlooked in the first estimation process.

Although the foregoing description of the embodiment has been given of the example where three image shape ratios are used, the invention is not limited to this case. That image shape ratio which provides a small multiple correlation coefficient and small partial regression coefficient of forearm rotation in the aforementioned step of determining the threshold values may not be used in the threshold value setting process and the first estimation process of estimating a human hand posture. That is, the estimation process of estimating a human hand posture may be carried out using only the image shape ratio which has a high correlation with the human hand posture.

Further, although the foregoing description of the embodiment has been given of the example where a hand wearing the data glove 30 is captured with the camera 32 and a hand image is generated using the captured image at the time of creating the database, the invention is not limited to this case. For example, only time-series data on the finger joint angles and forearm (wrist) joint angles may be acquired beforehand by using the data glove 30 and the forearm rotational angle measuring means 31, and a hand image may be generated by CG (Computer Graphics) editing software (e.g., Poser 5 (produced by Curious Labs Incorporated): Poser is a Registered Trademark) based on those data. More specifically, a hand image may be generated as follows. First, predetermined CG editing software is stored in the image data storage means 15 in the database creating device 10 in FIG. 1. Next, the image data storage means 15 acquires time-series data on the finger joint angles and forearm (wrist) joint angles from the time-series joint angle data storage means 12 and the time-sequential rotational angle data storage means 14, respectively. Then, the image data storage means 15 creates an extracted hand image needed to calculate the image shape ratios and image characteristic amounts with the CG editing software using the acquired data.

The aforementioned various kinds of data of a hand image may be acquired by the data glove 30, the bone length and thickness, the movable ranges of joints may be adjusted with the CG editing software, and then the hand image may be stored in the database. In this case, it is possible to cope with various human hand postures, such as a thick finger, a long finger, a well bendable finger, and fingers shorter than the palm. This can ensure estimation of a human hand posture regardless of old, young, male, female, race, and so forth.

The foregoing human hand posture estimating device and human hand posture estimation process according to the embodiment provide the following advantages. Even when a large-scale database is used to obtain high estimation accuracy, a most similar image can be retrieved fast. The most similar image can be found without the influence of the result of the previous search, so that even when a human hand posture changes significantly at the time of estimation, the most similar image can be found without lowering the estimation accuracy. In addition, creation of the database is facilitated. Therefore, the invention is suitable for the following applications.

(1) Since the hand posture can be estimated fast and with high accuracy using a single camera, it is possible to realize an information input device which can be used in an environment where a keyboard or a mouse is difficult to use, e.g., which can be used while a user is lying. More specifically, it is possible to change the contents to be displayed on the screen of an HMD (Head Mounted Display) with a small camera mounted thereon according to the movement of the user's hand. A virtual keyboard operation is possible. In another example, with the device used together with a large-screen display, the user can carry out the manipulation or the like of icons without touching the display by moving fingers with respect to the desktop screen. Further, in inputting data on a 3D structure, such as clay work, the user only has to move hands and arms in such a way as to make the shape of the structure.

(2) The invention can be applied to a virtual space game or the like which allows a user to enjoy a virtual object manipulation by hand and finger motions to knead, twist or smash some objects.

(3) In the field of robot engineering, it is possible to realize a robot which observes the motion of human fingers to automatically achieve the motion without requiring a person to provide the robot with a computer program. For example, in case of designing a robot which carries out interactive conversation with a person, if a person shows sign language motions to the robot and gives the meaning of the motions thereto beforehand, the robot can estimate the motions of a hand and an arm to automatically generate the sign language motions. Alternatively, the user without having sensors or the like attached thereon can remotely manipulate the robot with gestures or sign language motions as done daily.

[First Modification]

The data glove 30 used at the time of creating the database according to the embodiment can acquire data on adduction and abduction of a wrist (tilting of the wrist toward the thumb or the little finger) and flexion and extension (bending of the wrist toward the palm or the back of the hand) as described above. According to the embodiment, therefore, data on adduction and abduction and/or flexion and extension of a wrist may be added to a data set at the time of creating the data set. In this case, a data set containing a 3D motion can be generated easily. In this case, shape estimation on a 3D motion including adduction and abduction and/or flexion and extension of a wrist can be carried out without adding a new shape estimating algorithm.

According to the first modification, 3D motions including adduction and abduction and/or flexion and extension of a human wrist are actually captured with a camera, and shape estimation of the captured images is carried out with the human hand posture estimating device. Then, the estimation results are output to the robotic hand to drive the robotic hand. The driving results are shown in FIGS. 29 to 34. FIGS. 29 to 34 are snap shots taken when the human hand posture estimating device according to the first modification actually estimated the human hand postures of 3D motions. As apparent from FIGS. 29 to 34, 3D motions of human fingers are reproduced by the robotic hand with high accuracy and stably.

Figure 42A:
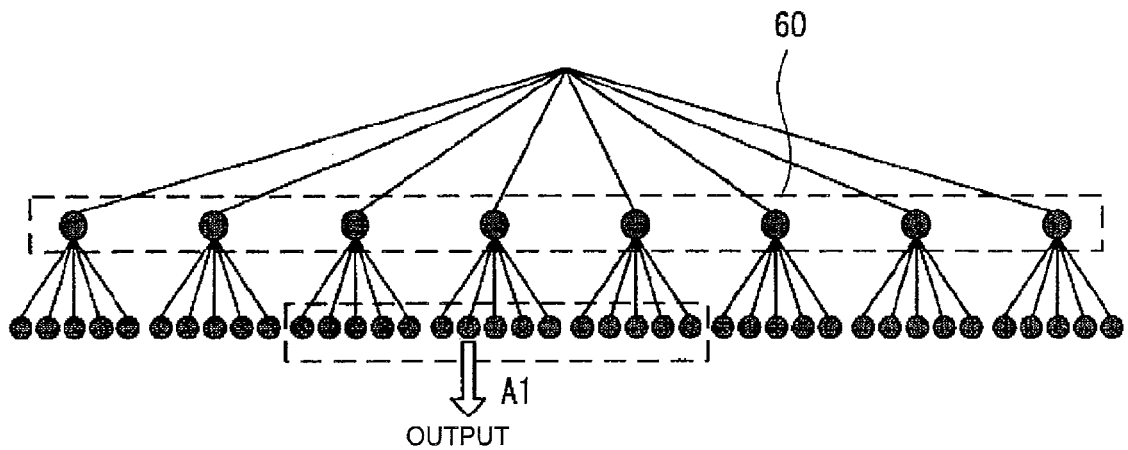
FIGS. 42A and 42B are diagrams illustrating a human hand posture estimation operation which is performed by the conventional human hand posture estimating device.
Figure 42B:
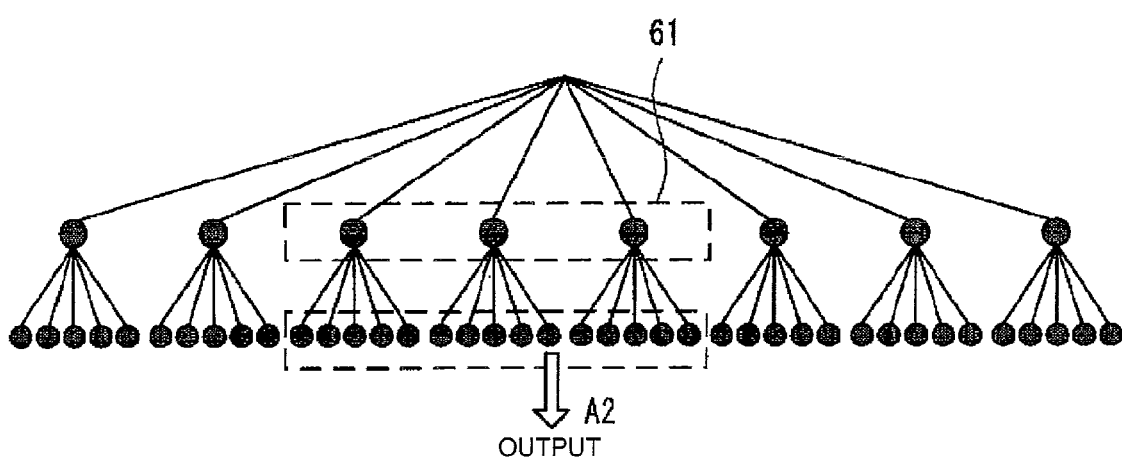
Figure 43A:
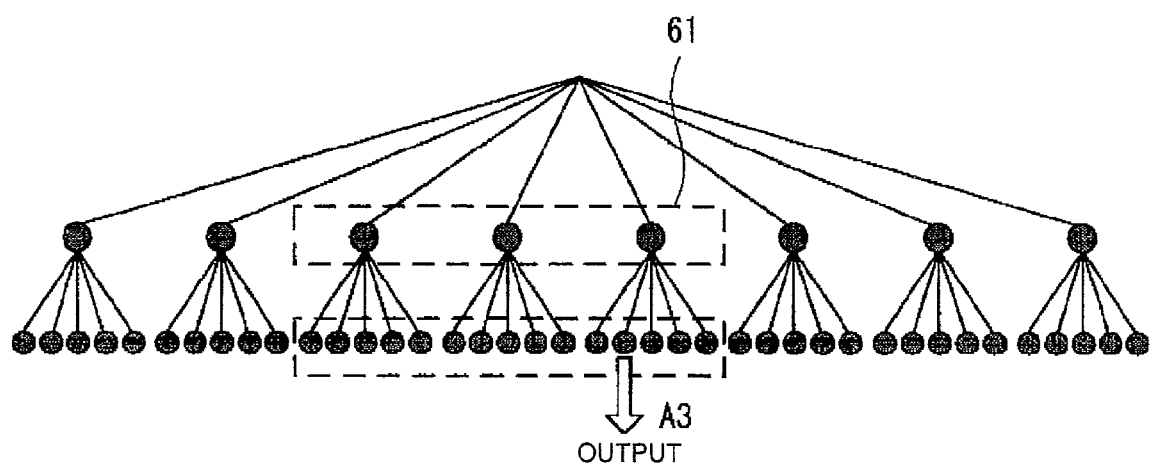
FIGS. 43A and 43B are diagrams illustrating the human hand posture estimation operation which is performed by the conventional human hand posture estimating device.
Figure 43B:
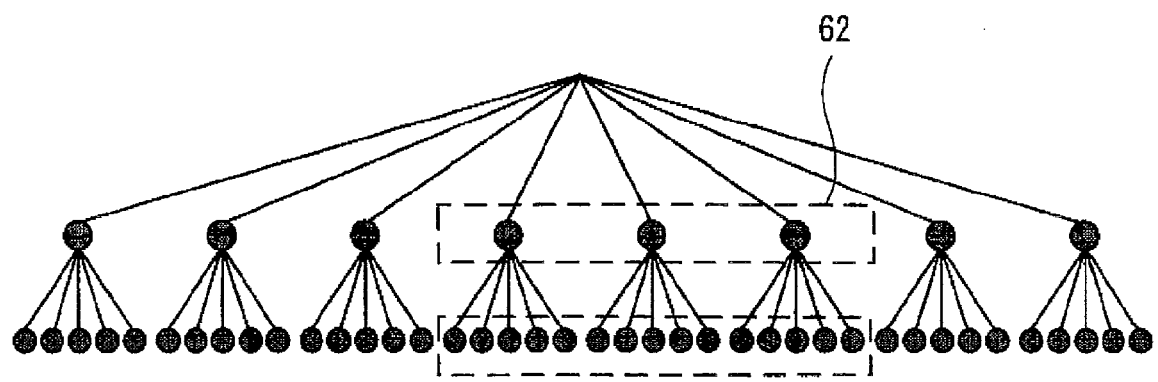

According to the embodiment and the first modification, for example, the number of images for collation is reduced to 150 or so from about 20,000 to 30,000 at the time of carrying out the second estimation process following the first estimation process. In the process of estimating a human hand posture using the conventional multi-layer database as shown in FIGS. 42A and 42B, for example, the number of images for collation in the search region of a similar image (search region 61 encircled by the dashed line in FIG. 42B) is about 200. Therefore, the embodiment and the first modification can obtain an estimation speed at least as fast as the conventional estimation speed. It is to be noted that the estimation speed can be made faster by further ideas, improvement, etc. on the estimation program or the like.

[Second Modification]

Although the foregoing description of the embodiment has been given of the example where the direction of extension of the forearm portion shown in the original image (captured image) of an extracted hand image is substantially orthogonal to the direction along the lower end (bottom portion) of the original image, for example, the invention is not limited to this case. The direction of extension of the forearm portion may not be substantially orthogonal to the direction along the lower end of the original image, or the forearm portion in the original image may be in contact with the side end of the original image (extend from the side end).

In such a case, the contour line of a hand is rotated in such a way that the direction of extension of the forearm portion in the original image faces a predetermined direction, e.g., the direction orthogonal to the direction along the lower end of the original image. The description of the second modification will be given of one exemplified configuration of the human hand posture estimating device which can perform such correction of the original image.

Figure 35:
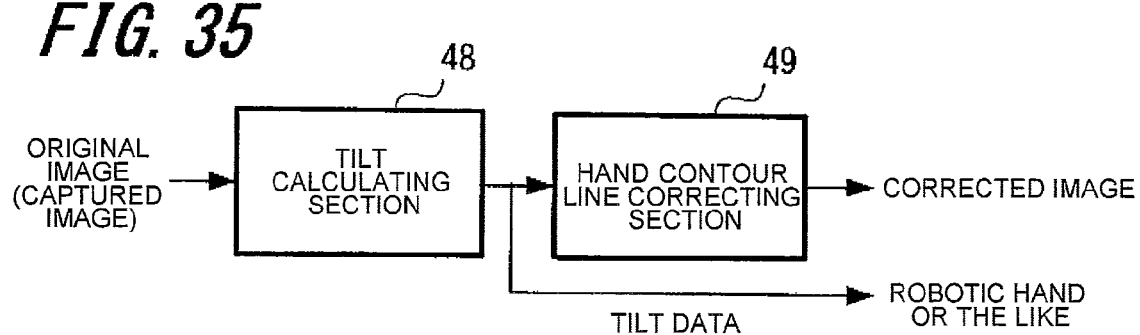
FIG. 35 is a schematic configuration diagram of essential portions which perform a process of correcting an original image according to a second modification.

FIG. 35 shows a exemplified configuration of essential portions which perform image correction in the human hand posture estimating device according to the second modification. The essential portions which perform correction on the original image include a tilt calculating section 48 and a hand contour line correcting section 49 (image correcting section). Those sections are included in the image data storage means 21 (hand image acquiring section) in the human hand posture estimating device (FIG. 1) of the embodiment.

The tilt calculating section 48 acquires the tilt of a forearm portion in an original image captured with a camera from the original image. The hand contour line correcting section 49 rotates the contour line of a hand based on the tilt of the forearm portion calculated by the tilt calculating section 48, so that the direction of extension of the forearm portion faces a predetermined direction (e.g., direction orthogonal to the direction along the lower end of the original image). Data on the tilt of the forearm portion calculated by the tilt calculating section 48 is output directly to the robotic hand or the CG generated hand.

Figure 36:
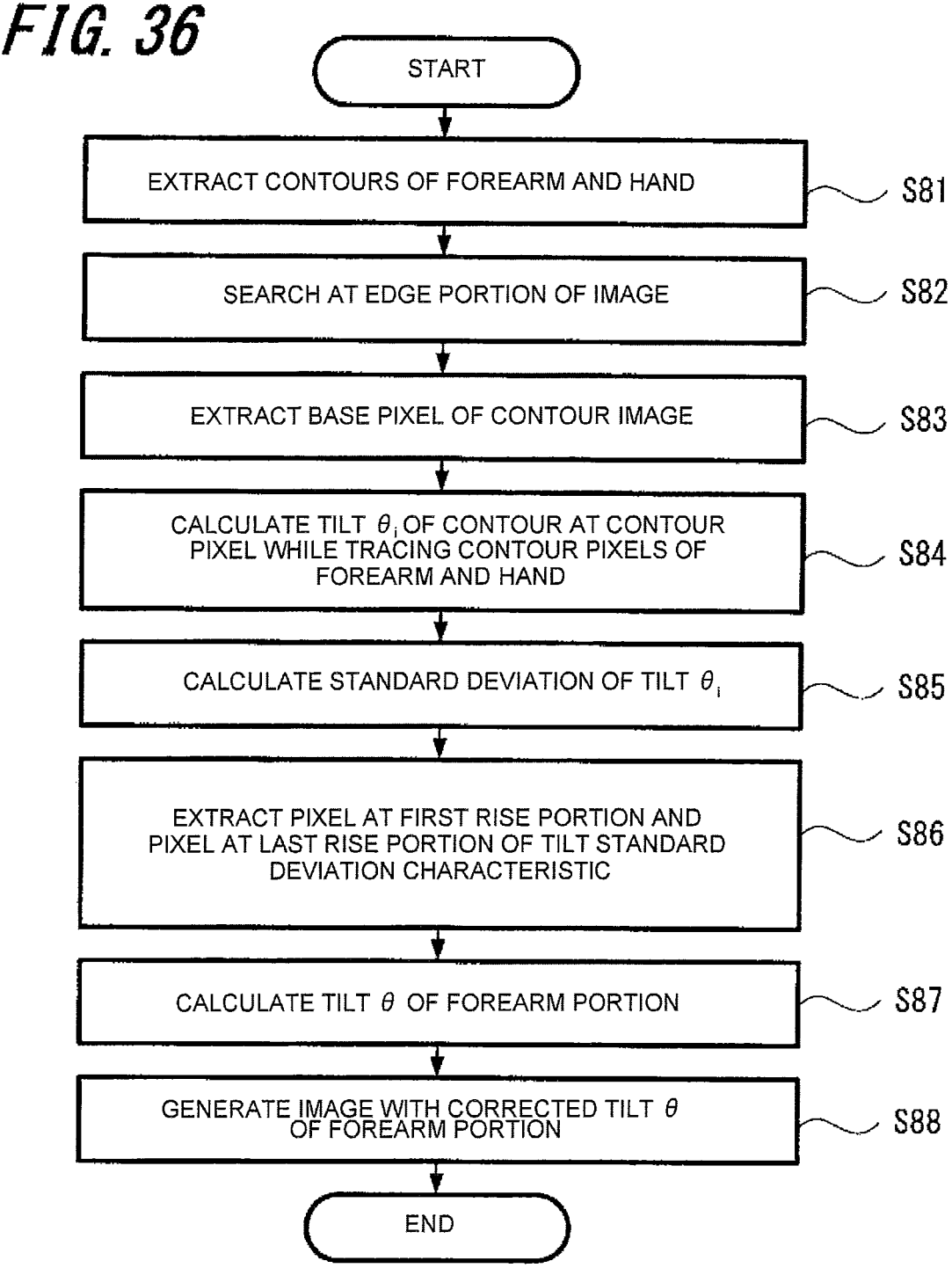
FIG. 36 is a flowchart illustrating procedures for the correction process for the original image according to the second modification.

One example of the method of calculating the tilt of the forearm portion in the original image will be described referring to FIG. 36. FIG. 36 is a flowchart illustrating a sequence of procedures from calculation of the tilt of the forearm portion in the original image to correction of the contour line of a hand. The following will describe an example where image correction is carried out in such a way that the direction of extension of the forearm portion becomes orthogonal to the direction along the lower end of the original image. In the correction process, the direction (predetermined direction) with which the direction of extension of the forearm portion is aligned can be adequately changed in consideration of the specifications of the shape estimating system, the application thereof, the convenience in control the system or the like.

Figure 37:
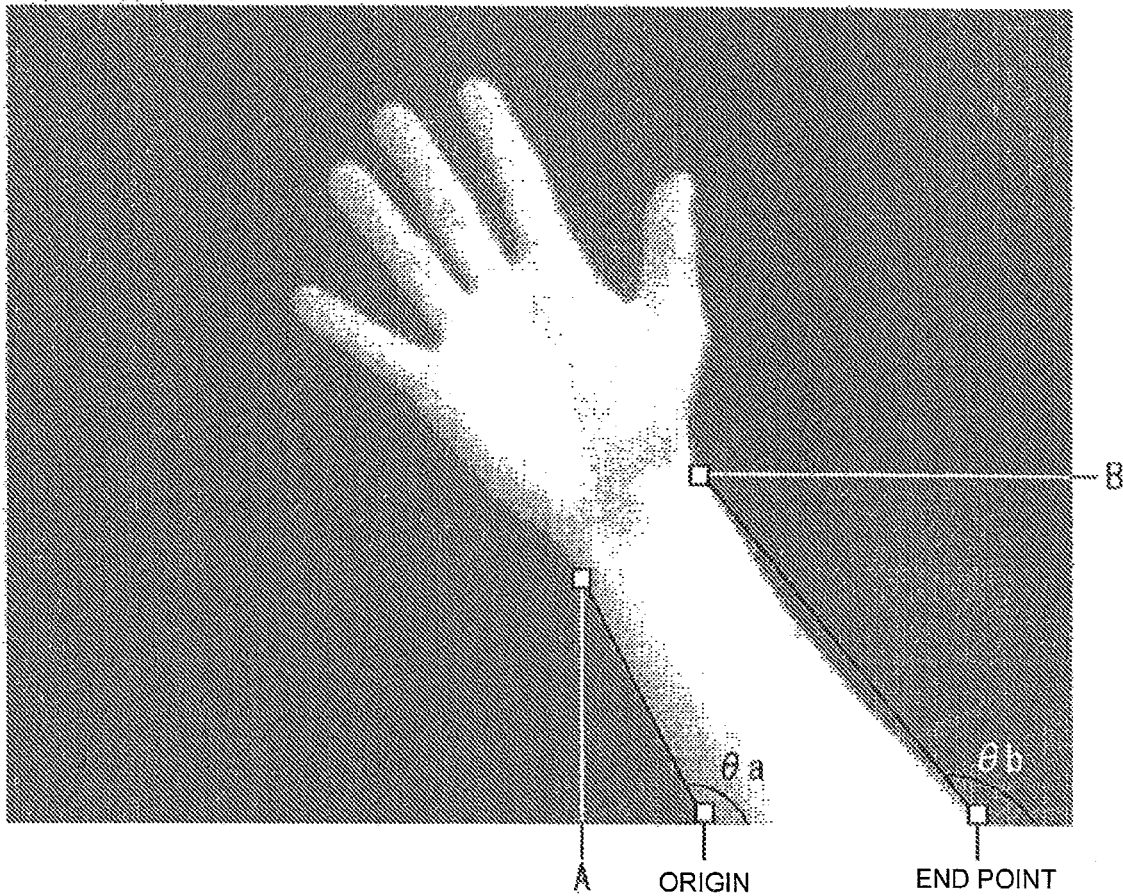
FIG. 37 is a diagram showing the outline of the correction process for the original image according to the second modification.

First, the tilt calculating section 48 acquires an original image (captured image) to extract the contour images of the forearm and a hand (step S81). FIG. 37 shows one example of the original image to be acquired. Next, the tilt calculating section 48 searches the edge portion of the original image (step S82). Specifically, the tilt calculating section 48 carries out the search, for example, along the direction from the pixel at the lower left end of the original image in FIG. 37 to the lower end. Then, the tilt calculating section 48 extracts an origin pixel (origin in FIG. 37) of a contour image through the search along the edge portion (step S83). At this time, determination of whether it is the contour image or not is made based on the pixel value (value of brightness).

Figure 38:
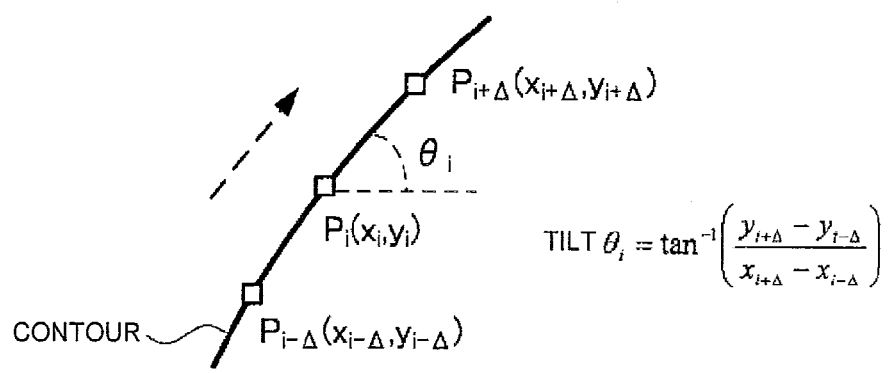
FIG. 38 is a diagram showing the outline of acquiring the tilt of a contour.

Next, the tilt calculating section 48 calculates the tilt of the contour of each contour pixel while tracing pixels on the contour image (hereinafter called contour pixels) from the origin pixel (step S84). FIG. 38 shows a schematic diagram of the method of calculating the tilt of the contour pixels. The solid line in FIG. 38 is the contour of the contour image, and the dashed-line arrow indicates the direction along which the contour pixels are traced in step S84.

The tilt $\theta_i$ of the contour image at a contour pixel $P_i$ located at a coordinate position $(x_i, y_i)$ in the original image is calculated from the following equation using the coordinate position $(x_{i+\Delta}, y_{i+\Delta})$ and coordinate position $(x_{i-\Delta}, y_{i-\Delta})$ of contour pixels $P_{i+\Delta}$ positioned away by $\pm\Delta$ pixels from the contour pixel $P_i$ along the contour.

$$\theta_i = \tan^{-1}\left(\frac{y_{i+\Delta} - y_{i-\Delta}}{x_{i+\Delta} - x_{i-\Delta}}\right) \quad [\text{Eq. 3}]$$

Figure 39:
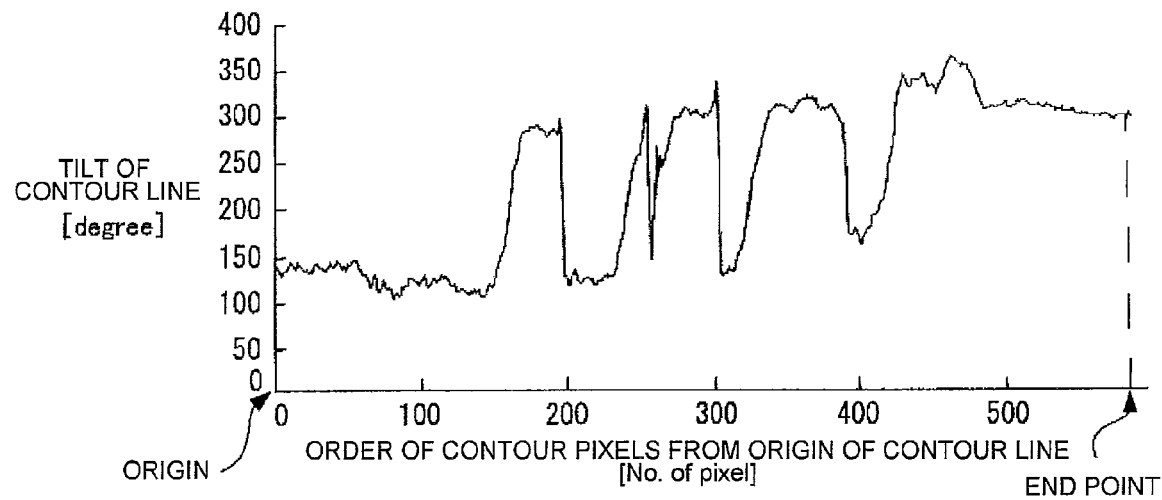
FIG. 39 is a diagram showing a change in the tilt of a contour along a contour line.

Then, step S84 of calculating the tilt of the contour of each contour pixel is carried out up to the end pixel (end point in FIG. 37) of the contour image. FIG. 39 shows a change in the tilt of the contour of each contour pixel, which has been calculated in step S84. The abscissa axis in FIG. 39 represents the distance of the contour pixel from the origin pixel, and the ordinate axis represents the tilt of the contour. Note that the angle of the tilt of the contour is 0 degrees in the direction from the lower left end of the original image shown in FIG. 37 toward the lower right end, and the angle in the anticlockwise (counterclockwise) direction is a positive angle.

As shown in FIG. 39, the tilts of the contours at the individual contour pixels while tracing the contour image from the origin are acquired, and substantially constant tilts are obtained from the contour pixel at the origin (0th contour pixel) to a contour pixel in the vicinity of about the 160th contour pixel. Thereafter, a change in the tilt of the contour significantly changes up to the vicinity of about the 420th contour pixel. Then, a change in the tilt of the contour becomes smaller in the region from a contour pixel in the vicinity of about the 420th contour pixel to the contour pixel at the end point. The region from the contour pixel at the origin (0th contour pixel) in FIG. 39 to a contour pixel in the vicinity of about the 160th contour pixel corresponds to the region from the origin in FIG. 37 to a contour pixel in the vicinity of point A, i.e., the region of the hand portion. The region from the contour pixel at the about 420th contour pixel in FIG. 39 to the contour pixel at the end point corresponds to the region from the a contour pixel in the vicinity of point B to the contour pixel at the end point, i.e., the region of the forearm portion. As apparent from FIG. 39, a change in the tilt of the contour becomes smaller in the region of the forearm portion.

Figure 40:
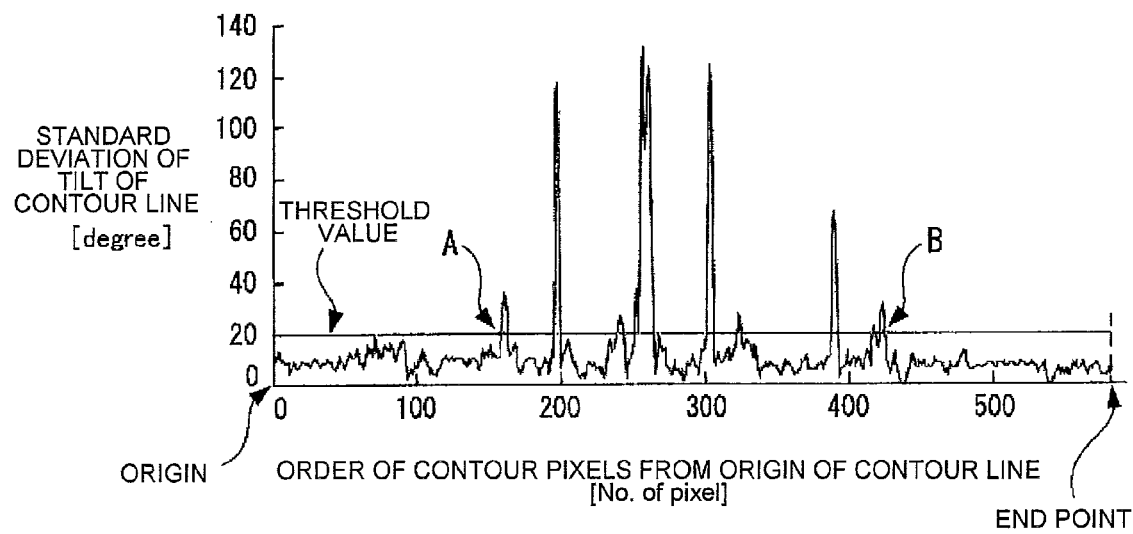
FIG. 40 is a diagram showing a change in the standard deviation of the tilt of a contour along a contour line.
Figure 41:
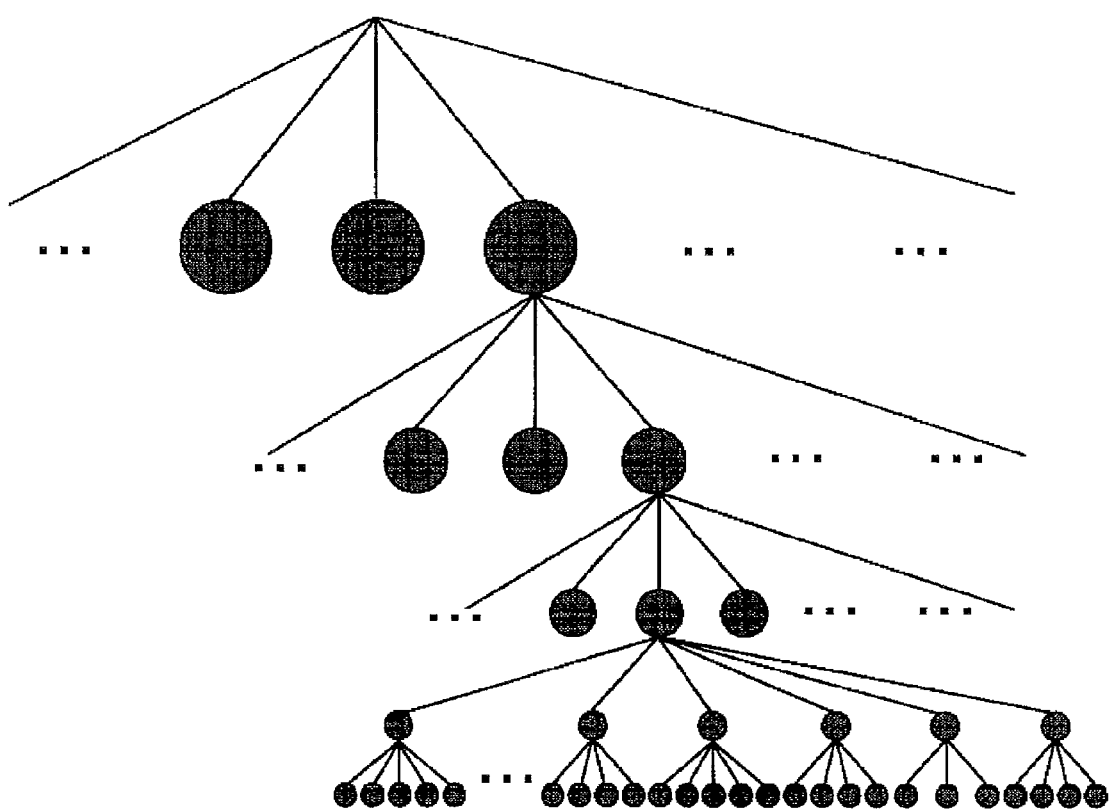
FIG. 41 is a diagram showing the structure of a database in a conventional human hand posture estimating device.

Next, the tilt calculating section 48 calculates the standard deviation of the tilt of the contour calculated in step S84 (step S85). The standard deviation of a predetermined contour pixel is acquired over the range between predetermined contour pixels including that contour pixel. More specifically, for example, the standard deviation at the contour pixel $P_i$ in FIG. 38 is acquired over the range between the contour pixels $P_{i+\Delta}$ and $P_{i-\Delta}$ positioned away by $\pm\Delta$ pixels from the contour pixel $P_i$ along the contour. Note that 10 pixels, for example, are selected as the value of the $\Delta$ pixels. The results are shown in FIG. 40. The abscissa axis in FIG. 40 represents the distance of the contour pixel from the origin pixel, and the ordinate axis represents the tilt of the contour. The example of FIG. 40 shows that the standard deviation significantly changes in the range from about the 160th contour pixel to the vicinity of about the 420th contour pixel (the region of the hand), and a change in the standard deviation becomes smaller in the other range (region of the forearm portion).

Next, the tilt calculating section 48 specifies the position of the contour pixels at point A and point B in FIG. 37 from the tilt of the contour and the characteristic of the standard deviation, which are acquired in step S85. Specifically, first, adequate threshold values are set, and the intersections with the characteristic of the standard deviation are acquired. In such intersections, the intersection at the rise portion of the standard deviation positioned closest to the origin is considered as the point of a contour pixel near point A in FIG. 37, so that this intersection is regarded as the point A in FIG. 37 in this modification. Since that intersection at the fall portion of the standard deviation positioned closest to the end point is considered as the point of a contour pixel near point B in FIG. 37, this intersection is regarded as the point B in FIG. 37 in the modification. In the modification, the contour pixels at the point A and point B in FIG. 37 and the coordinate positions thereof are extracted in this manner (step S86).

Next, the tilt calculating section 48 calculates the tilt θ of the forearm portion in the original image through the following equation from positional coordinates $(x_A, y_A)$ of the contour pixel at the point A and positional coordinates $(x_B, y_B)$ of the contour pixel at the point B, which are extracted in step S86, and positional coordinates $(x_S, y_S)$ of the origin pixel and positional coordinates $(x_E, y_E)$ of the end-point pixel. In the following equation, $θ_a$ is the tilt to the lower end of the original image of the forearm portion in the region from the origin to the point A, and $θ_b$ is the tilt to the lower end of the original image of the forearm portion in the region from the end point to the point B (see FIG. 37).

$$\theta = \frac{1}{2}(\theta a + \theta b) = \frac{1}{2}\left\{\tan^{-1}\left(\frac{y_A - y_S}{x_A - x_S}\right) + \tan^{-1}\left(\frac{y_B - y_E}{x_B - x_E}\right)\right\} \quad [\text{Eq. 4}]$$

Next, the tilt calculating section 48 outputs the tilt θ of the forearm portion calculated in step S87 to the hand contour line correcting section 49, as well as to the robotic hand and the CG generated hand.

Then, based on the input tilt θ of the forearm portion, the hand contour line correcting section 49 rotates the contour line of the hand in such a way that the direction of extension of the forearm portion is aligned with the direction orthogonal to the lower end of the original image to thereby generate a corrected image (step S88). In the second modification, correction of the original image is carried out this way. Thereafter, shape estimation is performed on the corrected image as per the embodiment and the first modification.

Although the position of the point A in FIG. 37 is exemplified to be near the wrist in the image correcting process according to the second modification, the position of the point A in FIG. 37 is near the tip of the little finger in an original image in which the region from the forearm portion to the tip of the little finger is almost straight. In this case too, however, the tilt of the region from the forearm portion to the tip of the little finger is equal to the tilt of the forearm portion in that region, so that the original image can be corrected in a way similar to the above-described procedures.

Although the foregoing description of the embodiment has been given of the example where the database and the human hand posture estimating device are configured as dedicated units, the invention is not limited to this case. For example, with necessary peripheral devices, such as a camera, connected to a personal computer apparatus which performs various kinds of data processing, software (program) which creates the database according to the invention and performs the process of discriminating (estimating) a human hand posture while referring to the database may be installed in the personal computer apparatus to carry out the processes of the invention. In this case, the program that executes the processes of the invention may be distributed in the form of a medium, such as an optical disc or semiconductor memory, as well as downloaded over transmission means such as the Internet.

DESCRIPTION OF REFERENCE NUMERALS

10: database creating device, 11, 13: sampling means, 12: time-series joint angle data storage means, 14: time-series rotational angle data storage means, 15: image data storage means, 16, 23: image characteristic amount extracting section, 17, 22: image shape ratio calculating section, 18: database (angle data, image characteristic amount, image shape ratio and operational instruction storage means), 19: threshold value determining means, 20: human hand posture estimating device, 24: collation means, 25: estimation means (image-characteristic-amount specifying and operational-instruction generating device), 26: drive instruction means, 30: data glove, 31: forearm rotational angle measuring means, 32, 33: camera, 48: tilt calculating section, 49: hand contour line correcting section, 50: hand image extracting section

The invention claimed is:

1. A human hand posture estimating device comprising at least one computer including at least one processor, the at least one computer comprising:
   a hand image acquiring section that acquires a first hand image;
   a shape data calculating section that calculates first shape data relating to vertical and horizontal sizes of the first hand image;
   an image characteristic amount extracting section that extracts a first image characteristic amount of the first hand image;
   a collation section that reads, from a database holding a plurality of data sets each having a set of angle data of a finger, second shape data relating to vertical and horizontal sizes of a second hand image of the hand, the second shape data in a predetermined data set, and collates the second shape data with the first shape data to form a first collated data set smaller than the predetermined data set that contains second shape data matched in collation with the first shape data; and
   an estimation section that collates a second image characteristic amount of the second hand image in the first collated data set with the first image characteristic amount to estimate a human hand posture of the first hand image,
   wherein the collation section collates the first hand image with the second hand image based on a difference between the first shape data and the second shape data, and
   wherein the shape data includes a first shape ratio obtained from a total number of vertical pixels of the hand image and a total number of horizontal pixels thereof, and a second shape ratio obtained based on a positional relation between a predetermined base pixel in the hand image and a pixel of an outer end of the hand image.

2. The human hand posture estimating device according to claim 1, further incorporating the database.

3. The human hand posture estimating device according to claim 1, wherein the image characteristic amount is an image characteristic amount of a segment image of the hand image.

4. The human hand posture estimating device according to claim 1, wherein the image characteristic amount is an image characteristic amount of an image of a predetermined size of pixels converted from the hand image.

5. The human hand posture estimating device according to claim 1, wherein the angle data of the finger includes joint angle data of the finger and rotational angle data of a wrist.

6. The human hand posture estimating device according to claim 1, wherein the angle data of the finger includes flexion and extension, and adduction and abduction of a wrist.

7. The human hand posture estimating device according to claim 1, wherein the estimation section outputs angle data of a finger in that data set which contains a second image characteristic amount most similar to the first image characteristic amount.

8. The human hand posture estimating device according to claim 1, further comprising a threshold value calculating device to be used at a time the collation section performs collation based on the difference between the first shape data and the second shape data.

9. The human hand posture estimating device according to claim 1, wherein the hand image acquiring section includes:
   a tilt calculating section that calculates tilt of a forearm portion in an original image of the first hand image; and
   an image correcting section that rotates the first hand image based on the tilt of the forearm portion calculated by the tilt calculating section in such a way that a direction of extension of the forearm portion faces a predetermined direction.

10. The human hand posture estimating device according claim 1, wherein the hand image acquiring section includes:
    an outermost contour extracting section that obtains an outermost contour pixel of a finger portion in the hand image in an original image of the hand image;
    a base extracting section that obtains a base pixel from an outermost contour pixel of the finger portion with a labeling process; and
    a hand image cutout section that determines a range of cutting out the hand image from the original image based on the outermost contour pixel and the base pixel.

11. The human hand posture estimating device according to claim 1, wherein the image characteristic amount is an image characteristic amount of a segment image of an image of a predetermined size of pixels converted from the hand image.

12. The human hand posture estimating device according to claim 1, wherein the second shape ratio comprises top-heaviness and right-biasness.

13. A human hand posture estimating method comprising:
    acquiring a first hand image;
    calculating first shape data relating to vertical and horizontal sizes of the first hand image and a first image characteristic amount of the first hand image;
    reading, from a database holding a plurality of data sets each having a set of angle data of a finger, second shape data relating to vertical and horizontal sizes of a second hand image of the hand, the second shape data in a predetermined data set;
    collating the first hand image with the second hand image based on a difference between the first shape data and the second shape data, resulting in a first collated data set smaller than the predetermined data set, the first collated data set containing second shape data matched with the first shape data;
    reading a second image characteristic amount of the second hand image in the first collated data set; and
    collating the first image characteristic amount with the second image characteristic amount to estimate a human hand posture of the first hand image;
    wherein the shape data includes a first shape ratio obtained from a total number of vertical pixels of the hand image and a total number of horizontal pixels thereof and a second shape ratio obtained based on a positional relation between a predetermined base pixel in the hand image and a pixel of an outer end of the hand image.

14. The human hand posture estimating method according to claim 13, wherein the second shape ratio comprises top-heaviness and right-biasness.

15. A non-transitory computer-readable medium with an installed program, wherein the program, when executed, causes a computer apparatus to perform the steps of:
    acquiring a first hand image;
    calculating first shape data relating to vertical and horizontal sizes of the first hand image and a first image characteristic amount of the first hand image;
    reading, from a database holding a plurality of data sets each having a set of angle data of a finger, second shape data relating to vertical and horizontal sizes of a second hand image of the hand, the second shape data in a predetermined data set;
    collating the first hand image with the second hand image based on a difference between the first shape data and the second shape data, said collating resulting in a first collated data set that is a subset of the predetermined data set, the first collated data set containing second shape data matched with the first shape data;
    reading a second image characteristic amount of the second hand image in the first collated data set; and
    collating the first image characteristic amount with the second image characteristic amount to estimate a human hand posture of the first hand image;
    wherein the shape data includes a first shape ratio obtained from a total number of vertical pixels of the hand image and a total number of horizontal pixels thereof and a second shape ratio obtained based on a positional relation between a predetermined base pixel in the hand image and a pixel of an outer end of the hand image.

16. The non-transitory computer-readable medium according to claim 15, wherein the second shape ratio comprises top-heaviness and right-biasness.

* * * * *